United States Patent
Arrazola et al.

(10) Patent No.: US 10,021,866 B2
(45) Date of Patent: Jul. 17, 2018

(54) MOBILE FISHING ROD TRANSPORTATION AND STORAGE SYSTEM

(71) Applicant: Roll-A-Rod, LLC, Miramar, FL (US)

(72) Inventors: Louis Phillip Arrazola, Miramar, FL (US); Jorge Amels Perez, Hialeah, FL (US); Peter Kratsch, Leander, TX (US)

(73) Assignee: Roll-A-Rod, L.L.C., Miramar, FL (US)

( * ) Notice: Subject to any disclaimer, the term of this patent is extended or adjusted under 35 U.S.C. 154(b) by 0 days.

(21) Appl. No.: 15/823,075

(22) Filed: Nov. 27, 2017

(65) Prior Publication Data

US 2018/0153150 A1    Jun. 7, 2018

Related U.S. Application Data

(63) Continuation of application No. 15/368,070, filed on Dec. 2, 2016, now Pat. No. 9,861,087.

(51) Int. Cl.
| | |
|---|---|
| *A01K 97/10* | (2006.01) |
| *B62B 3/04* | (2006.01) |
| *A47B 81/00* | (2006.01) |
| *B62B 3/00* | (2006.01) |

(52) U.S. Cl.
CPC ............ *A01K 97/10* (2013.01); *A47B 81/005* (2013.01); *B62B 3/005* (2013.01); *B62B 3/04* (2013.01); *B62B 2202/402* (2013.01)

(58) Field of Classification Search
CPC ...... A01K 97/10; A47B 81/005; B62B 3/002; B62B 3/005; B62B 3/02; B62B 3/04; B62B 3/102; B62B 2202/402

USPC .............................................. 280/79.2, 79.7
See application file for complete search history.

(56) References Cited

U.S. PATENT DOCUMENTS

| | | | |
|---|---|---|---|
| 3,555,719 A | 1/1971 | Butler | |
| 5,159,777 A * | 11/1992 | Gonzalez | A01K 97/08 280/47.19 |
| 5,438,789 A | 8/1995 | Emory | |
| 5,657,883 A | 8/1997 | Badia | |
| 6,052,937 A | 4/2000 | Morong | |
| 6,079,777 A * | 6/2000 | Simmons | A47C 1/143 108/157.17 |
| 6,289,627 B1 | 9/2001 | Gibbs et al. | |
| 6,381,897 B1 | 5/2002 | Walsh | |
| 6,401,381 B1 | 6/2002 | Broberg | |
| 6,550,791 B2 | 4/2003 | Ramsey | |

(Continued)

*Primary Examiner* — John D Walters
(74) *Attorney, Agent, or Firm* — Mayback & Hoffman, P.A.; Gregory L. Mayback

(57) ABSTRACT

A mobile fishing rod transportation and storage system includes two longitudinal and two horizontal rods. Four corners connect the longitudinal rods to the horizontal rods to form a frame. A first of the horizontal rods is horizontally and rotationally fixed to the longitudinal rods. A second of the horizontal rods is horizontally fixed to the longitudinal rods and is rotationally free with respect to the longitudinal rods to permit rotation of the second horizontal rod. At least one rod holder is rotationally connected with respect to one of the first and second horizontal rods between the longitudinal rods to both rotationally pivot along with the one horizontal rod when in a rod-holder locked state and rotationally move independently of the one horizontal rod when in a rod-holder unlocked state. A set of wheels is connected to the frame to permit the frame to roll upon a surface of the environment.

20 Claims, 29 Drawing Sheets

(56) References Cited

U.S. PATENT DOCUMENTS

| | | | |
|---|---|---|---|
| 6,739,084 B1 | 5/2004 | Hansen et al. | |
| 7,017,940 B2 | 3/2006 | Hatfull | |
| 7,114,281 B2 | 10/2006 | Miller | |
| 7,384,051 B1 | 6/2008 | Haire | |
| 7,461,477 B2 | 12/2008 | Allen | |
| 7,703,795 B2 * | 4/2010 | Williamson | A01K 97/10 280/40 |
| 8,746,377 B1 * | 6/2014 | Dunbar | B62B 5/0003 180/19.2 |
| 9,282,797 B1 * | 3/2016 | Soto | A45C 11/20 |
| 9,565,934 B2 * | 2/2017 | Hall, II | A47B 81/005 |
| 2013/0200021 A1 * | 8/2013 | Dufty | A47F 7/0021 211/70.8 |
| 2014/0110363 A1 | 4/2014 | Brown et al. | |
| 2014/0263113 A1 | 9/2014 | Hall, II | |
| 2016/0045024 A1 | 2/2016 | Roberts et al. | |

* cited by examiner

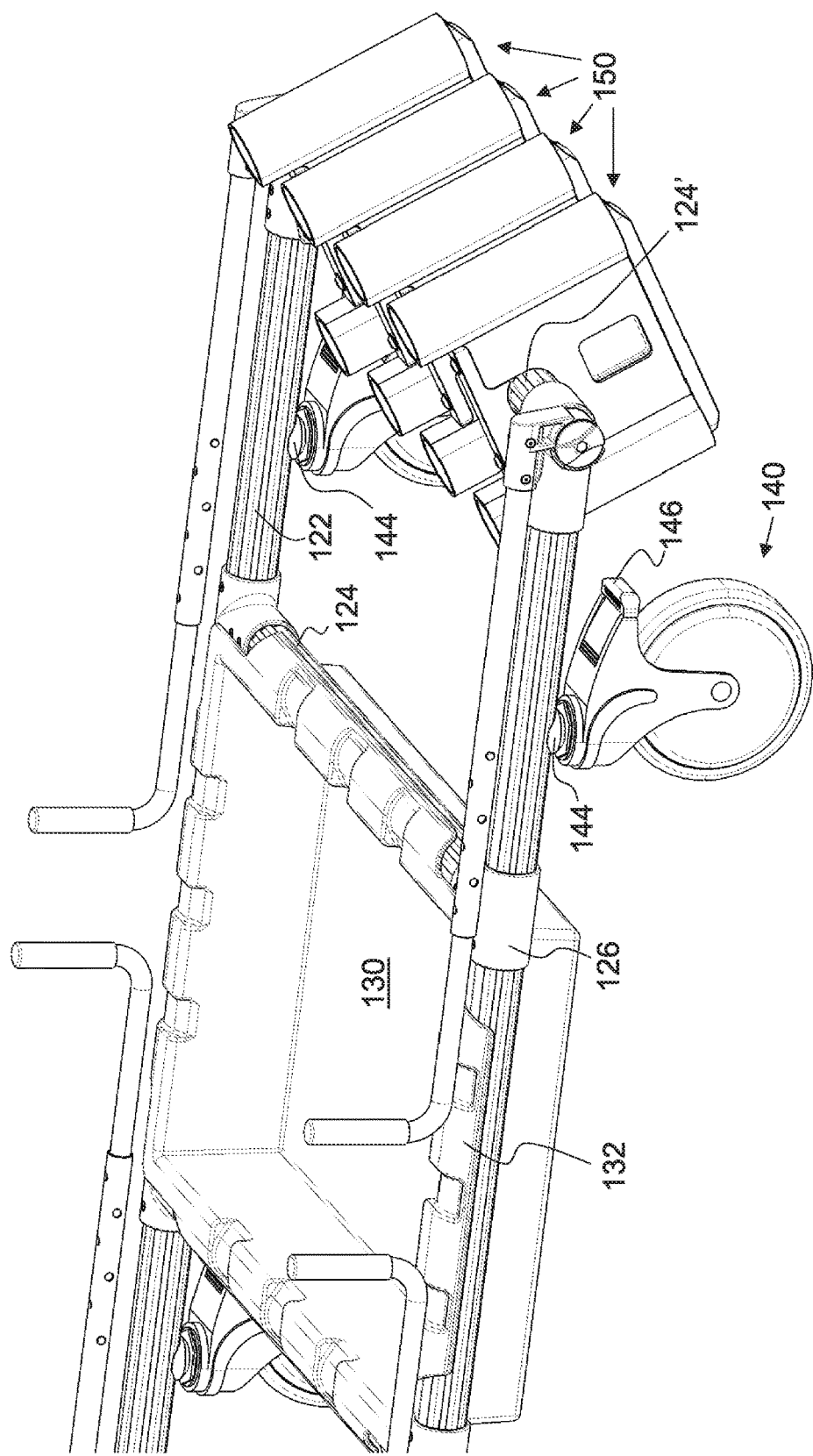

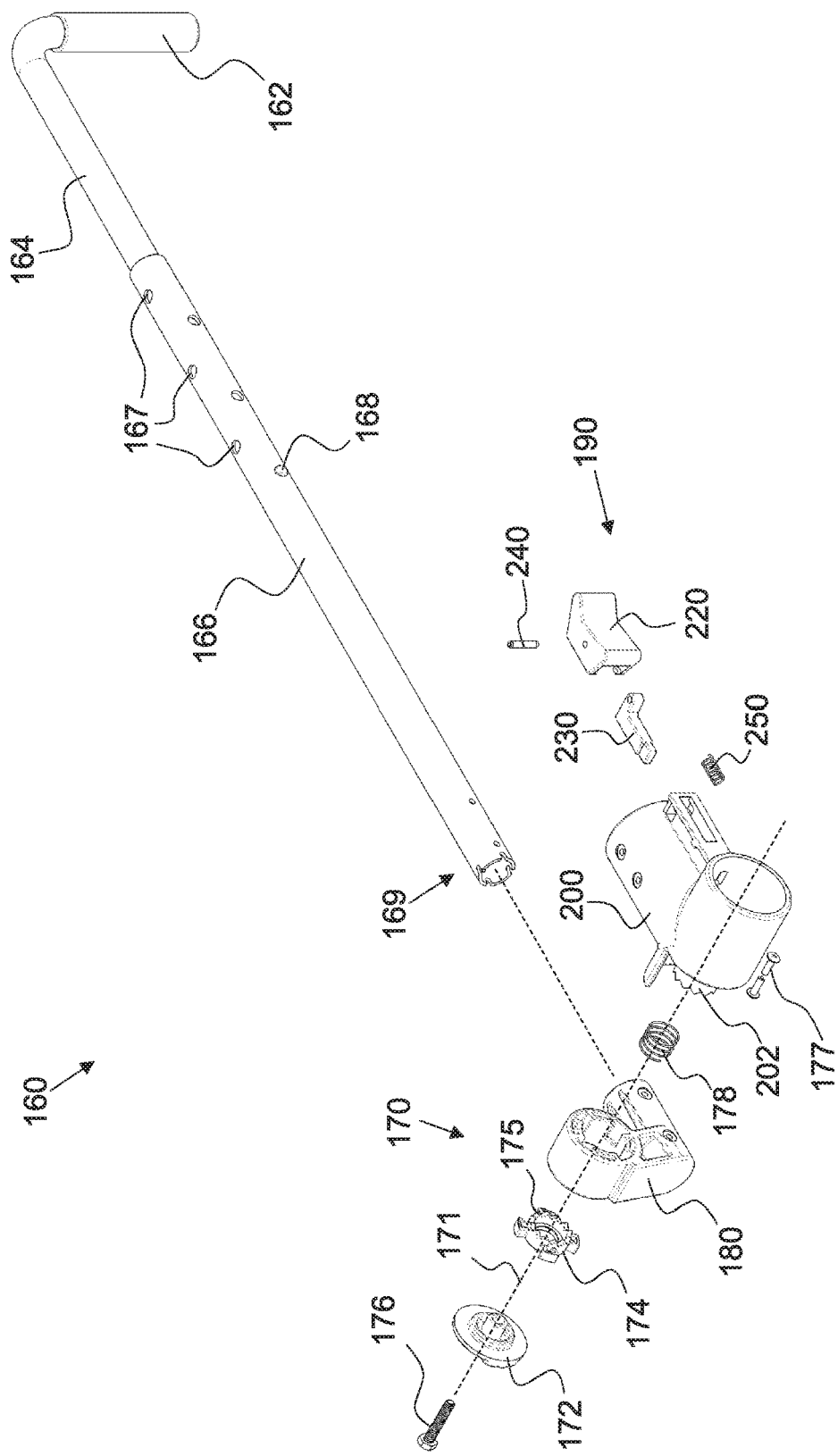

MOBILE FISHING ROD TRANSPORTATION AND STORAGE SYSTEM

CROSS-REFERENCE TO RELATED APPLICATIONS

This application is a continuation of U.S. patent application Ser. No. 15/368,070, filed on Dec. 2, 2016, the entire disclosure of which is hereby incorporated herein by reference in its entirety.

STATEMENT REGARDING FEDERALLY SPONSORED RESEARCH OR DEVELOPMENT

Not Applicable

FIELD OF THE INVENTION

The present systems, apparatuses, and methods lie in the field of mobile carts. The present disclosure relates to a mobile transportation and storage system for fishing rods.

BACKGROUND OF THE INVENTION

Fishing rods are long and, in terms of movement and storage, are bulky. Rods are typically not stored on boats and, therefore, need to be moved at least from a secure location on the ground to the boat on which they are to be used. For typical fishing trips, many rods and different rods are needed, leading to the multiplied problem of how to move so many rods from one place to another without damaging the expensive and, sometimes, fragile parts. The safest way to transport a large number of rods is by hand, typically with the person carrying no more than one rod in each hand. Because of the length of even the shortest fishing rod, such movement is perilous, as accidental snagging and hitting of the environment can often break a rod, even if it is made of carbon fiber. Sometimes anglers transport rods in a bundle. For example, four to eight rods are placed, handle-first, into a standard five-gallon bucket, and the angler carries the bucket from a garage, where the rods are stored, to a boat or trailer. However, such grouping invariably tangles the lines, hooks and snags the rod's eyelets, and interweaves the rods in a manner that often causes injury. Even the smallest injury is expensive due to the high cost of common rods and reels.

Thus, a need exists to overcome the problems with the prior art systems, designs, and processes as discussed above.

SUMMARY OF THE INVENTION

The systems, apparatuses, and methods described provide a mobile fishing rod transportation and storage system that overcomes the hereinafore-mentioned disadvantages of the heretofore-known devices and methods of this general type and that provide such features with an ability to carry and store at least eight fully rigged fishing rods in a compact configuration that is safe on the rods to move about on the ground.

The mobile fishing rod transportation and storage system, also referred to as the "X-Rack," is a revolutionary system that enables one person to carry up to sixteen or even more salt or fresh water fishing rods at one time. The system is sized to accommodate seven-foot rods but can carry salt or fresh water rods of various heights depending on their use. The system enables a person to transport fishing rods between the fishing location (boat, dock, pier, etc.) and their personal vehicle or storage facility with ease and in one step. The rack can be pushed or pulled, steered into elevators, escalators, garages, or hotel rooms with little effort while carrying up to 16 fishing rods at one time. Multiple configurations allow the system to be used while transporting many rods simultaneously and sized to clear any garage, hotel room, or elevator door. Each rod mount is pivotably adjustable and can be configured to offset opposing rods laterally, thereby allowing the rods to overlap each other in a crossed or X-configuration or to tilt all of the rods in one direction or another. The pivoting and nesting allows the rods to be lowered in increments sufficiently far to place the highest point of the stowed rods at a height below the average height of a standard door opening. The width of the system is sized to allow entrance into all standard doorframes without the need to remove any rods from the system. In one exemplary embodiment, the overall system measures 55" L×27" W (approximately 140 cm×69 cm).

In one exemplary configuration, the system is mounted on 6×1¼" maintenance free swivel caster wheels with brakes, which result in an overall mounted height of 7½". Each wheel is resistant to chemicals and comes with a sealed precision bearing race, ball bearings and full thread guards. Each wheel also has total or directional lock capability and can be swiveled allowing the system to be steered easily. The wheels can be locked at 90 degrees or can be released to swivel as necessary during use.

With the foregoing and other objects in view, there is provided, a mobile fishing rod transportation and storage system comprising at least two longitudinal rods, at least two horizontal rods, four corner sub-assemblies connecting the at least two longitudinal rods to the at least two horizontal rods to form a frame, the at least two longitudinal rods being longitudinally and rotationally fixed and the at least two horizontal rods being horizontally fixed and rotationally free, at least one rod holder rotationally fixed to one of the at least two horizontal rods between the at least two longitudinal rods to rotationally pivot with the one horizontal rod, and a set of wheels connected to the frame to permit the frame to roll upon a surface of the environment.

In accordance with another feature, the at least two horizontal rods comprise two end horizontal rods and one central horizontal rod, the central horizontal rod having a given exterior shape, and there are provided two T-brackets each connected respectively to one of the at least two longitudinal rods and each having a hollow internal leg connected to an end of the central horizontal rod to longitudinally fix the central horizontal rod to the at least two longitudinal rods, the internal leg having an interior shape corresponding to the given exterior shape to rotationally fix the one central horizontal rod when inserted therein.

In accordance with a further feature, the at least two horizontal rods comprise two end horizontal rods and two central horizontal rods, the two central horizontal rods having a given exterior shape, and there are provided four T-brackets each connected respectively to one of the at least two longitudinal rods and each having a hollow internal leg connected to an end of one of the central horizontal rods to longitudinally fix the respective central horizontal rod to the at least two longitudinal rods, the internal leg having an interior shape corresponding to the given exterior shape to rotationally fix a respective one of the central horizontal rods when inserted therein, the two central horizontal rods and the at least two longitudinal rods defining therebetween a central opening, and a storage bin shaped to fit in the central opening and be carried by the frame.

In accordance with an added feature, at least one of the four corner sub-assemblies is a handle sub-assembly comprising a corner bracket connected to one of the at least two longitudinal rods and one of the at least two horizontal rods.

In accordance with an additional feature, the handle sub-assembly comprises a handle that is pivotally connected to the corner bracket to raise and lower the handle about a pivot axis with respect to the frame.

In accordance with yet another feature, the at least two longitudinal rods has an outer surface with a given shape, the at least two horizontal rods has an outer surface with the given shape, and the corner bracket comprises a first recess having an interior shape corresponding to the given shape to longitudinally and rotationally fix one end of one longitudinal rod therein and a second recess having a smooth interior longitudinally fixing and rotationally freely connecting one end of one horizontal rod therein.

In accordance with yet a further feature, the given shape is a toothed spindle.

In accordance with yet an added feature, the handle sub-assembly comprises a handle configured to telescope to elongate from a shortened state to a lengthened state, a handle rotation lock assembly having a lock that selectively locks and unlocks rotation of the handle about the pivot axis, and a rod-holder lock assembly having a lock that selectively locks and unlocks rotation of the one horizontal rod with respect to the corner bracket.

In accordance with yet an additional feature, the at least two longitudinal rods and the at least two horizontal rods have a cross-section with a given outer shape.

In accordance with again another feature, the given outer shape is one of a circle, a gear, an oval, an ellipse, a stadium, a quatrefoil, a trefoil, a cinquefoil, a nephroid, a kidney, and an egg.

In accordance with again a further feature, the given outer shape is one of a polygon, a triangle, a square, a pentagon, a hexagon, a heptagon, an octagon, a nonagon, and a decagon.

In accordance with again an added feature, the at least one rod holder is at least one dual-rod holder.

In accordance with again an additional feature, the at least one rod holder is at least one dual-rod holder on each of the two horizontal rods between the at least two longitudinal rods to rotationally pivot with a respective one of the at least two horizontal rods.

In accordance with still another feature, the at least one rod holder is a set of dual-rod holders on one of the at least two horizontal rods between the at least two longitudinal rods, the set of dual-rod holders rotationally pivoting together the one horizontal rod.

In accordance with still a further feature, the at least one rod holder is a set of dual-rod holders on each of the at least two horizontal rods between the at least two longitudinal rods, each set of dual-rod holders rotationally pivoting together on a respective one of the at least two horizontal rods.

In accordance with still an added feature, the set of dual-rod holders is a set of four dual-rod holders.

In accordance with a further feature, the at least two longitudinal rods are two longitudinal rods and the set of wheels is a set of four casters, two of the casters being connected to a first of the two longitudinal rods, and two of the casters being connected to a second of the two longitudinal rods.

With the foregoing and other objects in view, there is provided, a mobile fishing rod transportation and storage system comprising at least two longitudinal rods, at least two horizontal rods, four corners connecting the at least two longitudinal rods to the at least two horizontal rods to form a frame, a first of the horizontal rods being horizontally and rotationally fixed to the at least two longitudinal rods, a second of the horizontal rods being horizontally fixed to the at least two longitudinal rods and being rotationally free with respect to the at least two longitudinal rods to permit rotation of the second horizontal rod, at least one rod holder rotationally connected with respect to one of the first and second horizontal rods between the at least two longitudinal rods to both rotationally pivot along with the one horizontal rod when in a rod-holder locked state and rotationally move independently of the one horizontal rod when in a rod-holder unlocked state, and a set of wheels connected to the frame to permit the frame to roll upon a surface of the environment.

With the objects in view, there is also provided a mobile fishing rod transportation and storage system comprising at least two longitudinal rods, at least two horizontal rods, a central horizontal rod, four corners connecting the at least two longitudinal rods to the at least two horizontal rods to form a frame, a first of the horizontal rods being horizontally and rotationally fixed to the at least two longitudinal rods, a second of the horizontal rods being horizontally fixed to the at least two longitudinal rods and being rotationally free with respect to the at least two longitudinal rods to permit rotation of the second horizontal rod, at least one rod holder rotationally connected with respect to one of the first and second horizontal rods between the at least two longitudinal rods to both rotationally pivot along with the one horizontal rod when in a rod-holder locked state and rotationally move independently of the one horizontal rod when in a rod-holder unlocked state, a set of wheels connected to the frame to permit the frame to roll upon a surface of the environment, and two central brackets each connected respectively to one of the at least two longitudinal rods at an intermediate position between the at least two horizontal rods and one end of the central horizontal rod to longitudinally and rotationally fix the central horizontal rod to the respective one of the at least two longitudinal rods.

With the objects in view, there is also provided a mobile fishing rod transportation and storage system comprising at least two longitudinal rods, at least two horizontal rods, four corners connecting the at least two longitudinal rods to the at least two horizontal rods to form a fixed frame with the at least two horizontal rods being horizontally and rotationally fixed to the at least two longitudinal rods in a frame plane, at least one rod holder rotationally connected with respect to one of the first and second horizontal rods between the at least two longitudinal rods to both rotationally pivot along with the one horizontal rod when in a rod-holder locked state and rotationally move independently of the one horizontal rod when in a rod-holder unlocked state, and a set of wheels connected to the frame to permit the frame to roll upon a surface of the environment.

In accordance with another feature, the first of the horizontal rods is horizontally and rotationally fixed to the at least two longitudinal rods adjacent a first pair of the four corners and the second pair of the four corners comprising corner sub-assemblies rotationally freely connecting the second horizontal rod to the at least two longitudinal rods to permit rotation of the second horizontal rod.

In accordance with a further feature, the at least one rod holder comprises opposing clamp pieces movable with respect to one another between a closed position comprising the rod-holder locked state in which the at least one rod holder is rotationally fixed to the one horizontal rod and an open position comprising the rod-holder unlocked state in which the at least one rod holder is rotationally free to rotate about the one horizontal rod.

In accordance with an added feature, the at least one rod holder comprises a fastening mechanism that moves the clamp pieces between the closed position and the open position. In an exemplary embodiment, the fastening mechanism comprises a U-bracket, a plate, and nuts.

In accordance with an additional feature, the at least two longitudinal rods and the at least two horizontal rods define a frame plane and the one horizontal rod has a rotation axis fixed within the frame plane.

In accordance with yet another feature, the at least two longitudinal rods and the at least two horizontal rods define a frame plane and the one horizontal rod has a rotation axis fixed within the frame plane and rotationally moves about the rotation axis.

In accordance with yet a further feature, the at least two longitudinal rods comprise a left longitudinal rod and a right longitudinal rod and the at least two horizontal rods comprise the first horizontal rod having a first left end fixed to the left longitudinal rod and a first right end fixed to the right longitudinal rod, and the second horizontal rod having a second left end pivotally connected to the left longitudinal rod and a second right end pivotally connected to the right longitudinal rod.

In accordance with yet an added feature, the at least two longitudinal rods have an outer surface with a given shape, the at least two horizontal rods have an outer surface with the given shape, and at least two of the four corners are brackets comprising a first recess having an interior shape corresponding to the given shape to longitudinally and rotationally fix one end of one longitudinal rod therein and a second recess having a smooth interior longitudinally fixing and rotationally freely connecting one end of the one horizontal rod therein. In an exemplary embodiment, the given shape is a toothed spindle.

In accordance with yet an additional feature, the at least one rod holder is at least one dual-rod holder on each of the at least two horizontal rods between the at least two longitudinal rods, the at least one dual-rod holder on the second horizontal rod rotationally pivoting with the second horizontal rod when in the rod-holder locked state and rotationally moving independently of the second horizontal rod when in the rod-holder unlocked state.

In accordance with again another feature, the at least two horizontal rods comprise two end horizontal rods and one central horizontal rod, the central horizontal rod having a given exterior shape, and which further comprises two central brackets each connected respectively to one of the at least two longitudinal rods at an intermediate position between the at least two horizontal rods and to one end of the central horizontal rod to longitudinally and rotationally fix the central horizontal rod to the respective one of the at least two longitudinal rods.

In accordance with again a further feature, the at least two horizontal rods comprise two end horizontal rods and two central horizontal rods, the two central horizontal rods having a given exterior shape, and which further comprises four T-brackets each connected respectively to one of the at least two longitudinal rods at an intermediate position between the at least two horizontal rods and one end of one of the central horizontal rods to longitudinally and rotationally fix a respective one of the central horizontal rods to the respective one of the at least two longitudinal rods, the two central horizontal rods and the at least two longitudinal rods defining therebetween a central opening, and a storage bin shaped to fit in the central opening and be carried by the frame.

In accordance with again an added feature, at least one of the four corners is a handle sub-assembly comprising a corner bracket connected to one of the at least two longitudinal rods and one of the at least two horizontal rods, a handle that is pivotally connected to the corner bracket to raise and lower the handle about a pivot axis with respect to the frame.

In accordance with again an additional feature, the handle configured to telescope to elongate from a shortened state to a lengthened state and the handle sub-assembly comprises a handle rotation lock assembly having a lock that selectively locks and unlocks rotation of the handle about the pivot axis and a rod-holder lock assembly having a lock that selectively locks and unlocks rotation of the second horizontal rod with respect to the corner bracket.

In accordance with still another feature, the at least two longitudinal rods and the at least two horizontal rods have a cross-section with a given outer shape selected from one of a circle, a gear, an oval, an ellipse, a stadium, a quatrefoil, a trefoil, a cinquefoil, a nephroid, a kidney, an egg, a polygon, a triangle, a square, a pentagon, a hexagon, a heptagon, an octagon, a nonagon, and a decagon.

In accordance with still a further feature, the at least two longitudinal rods are two longitudinal rods and the set of wheels is a set of four casters, two of the casters being connected to a first of the two longitudinal rods, and two of the casters being connected to a second of the two longitudinal rods.

In accordance with a concomitant feature, the set of wheels is connected only to the at least two longitudinal rods.

Although the systems, apparatuses, and methods are illustrated and described herein as embodied in a mobile transportation and storage system for fishing rods, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which:

FIG. 3 is a fragmentary, perspective view of a portion of the system of FIG. 1;

FIG. 6 is a exploded, perspective view of a handle sub-assembly of the system of FIG. 1;

DETAILED DESCRIPTION OF THE EMBODIMENTS

Figure 1:
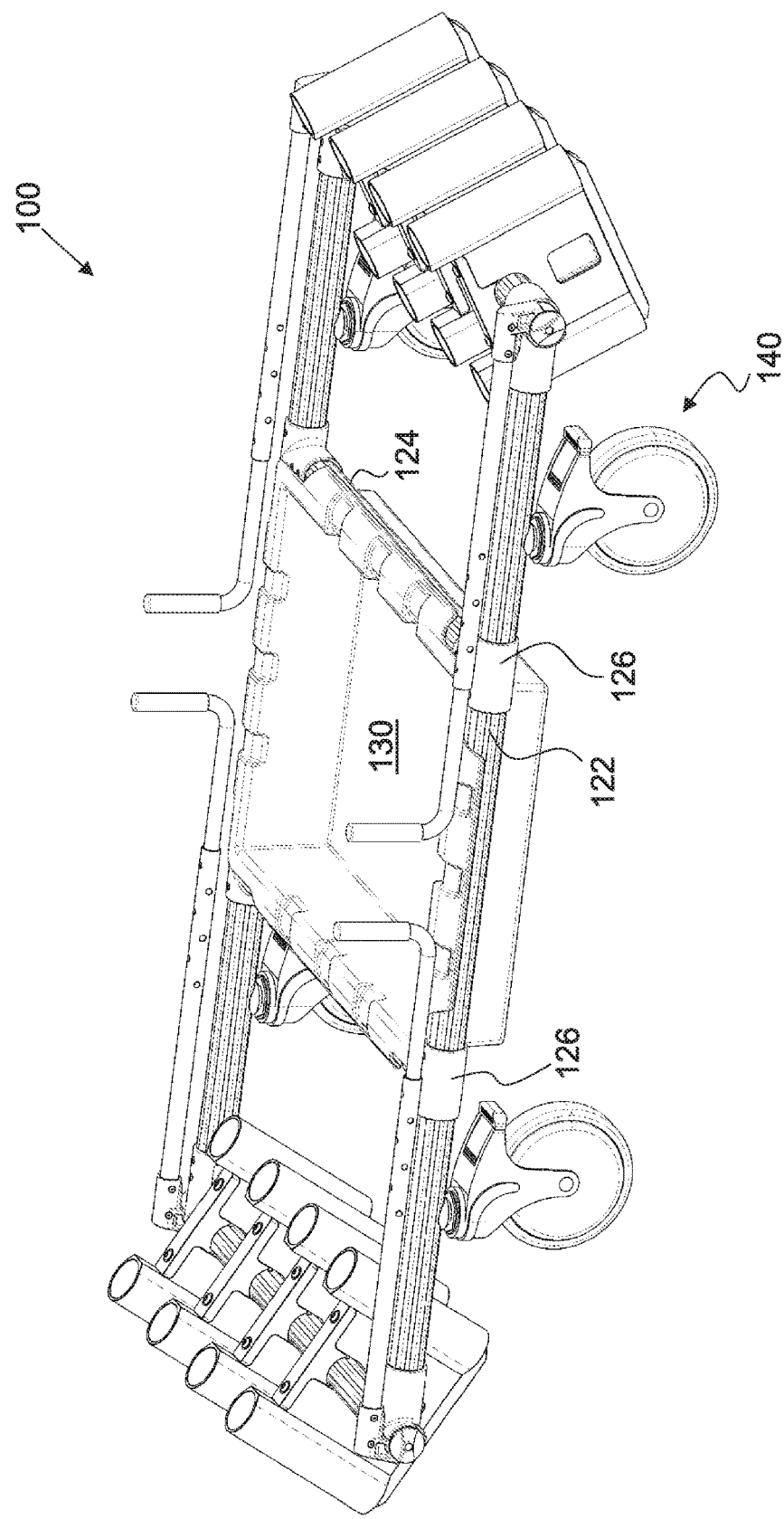
FIG. 1 is a perspective view of an exemplary embodiment of a mobile fishing rod transportation and storage system.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means that, when comparing various parts to one another, the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 2:
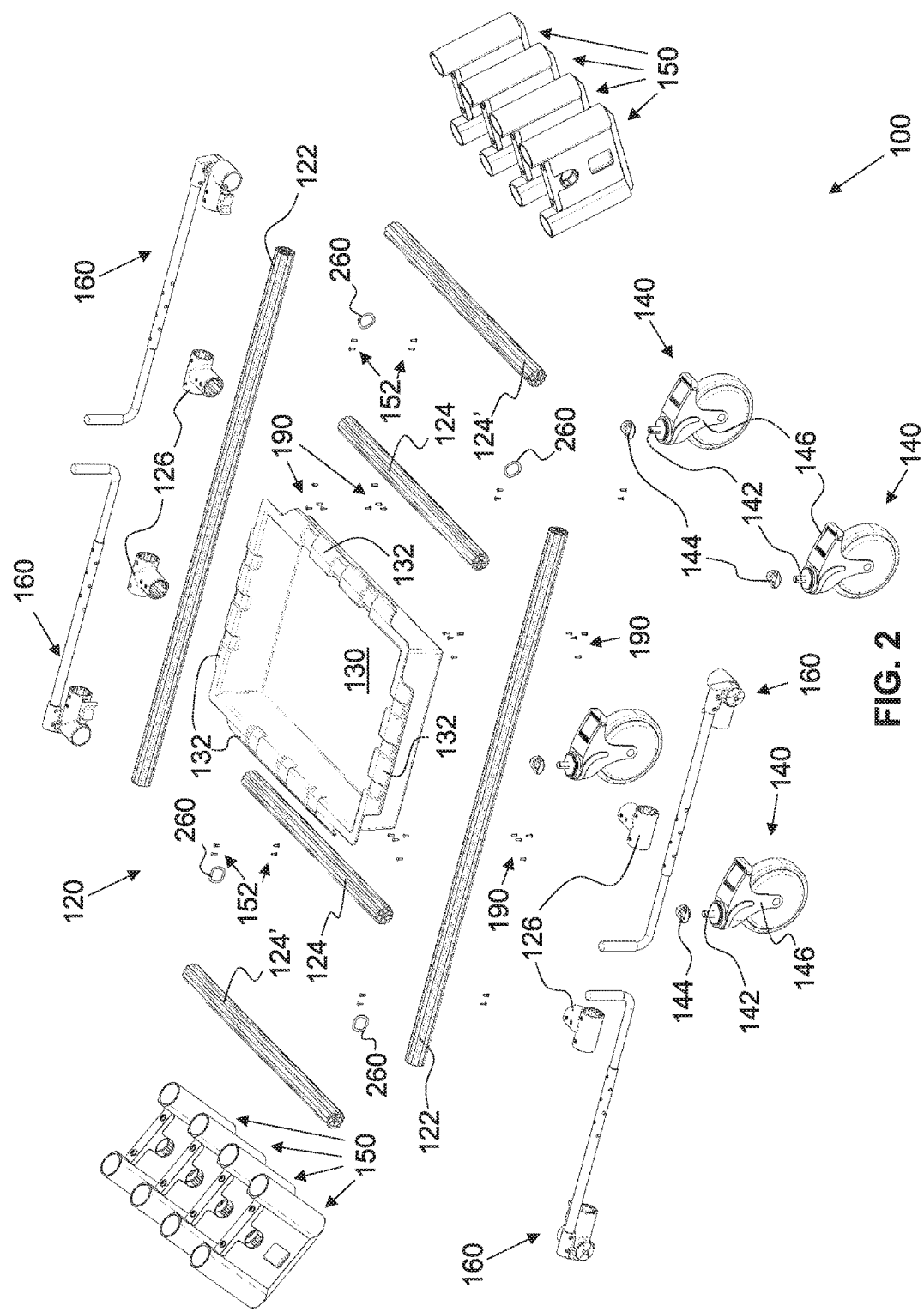
FIG. 2 is an exploded, perspective view of the system of FIG. 1.

Described now are exemplary embodiments. Referring now to the figures of the drawings in detail and first, particularly to FIGS. 1 to 3, there is shown a first exemplary embodiment of a mobile fishing rod transportation and storage system 100. The system 100 in FIG. 1 is shown fully assembled and FIG. 2 shows the system 100 in an exploded configuration where most of the parts are separated from one another. The system 100 is comprised of various sub-assemblies including a frame sub-assembly, a rod-holder sub-assembly, and handle sub-assemblies.

Figure 4:
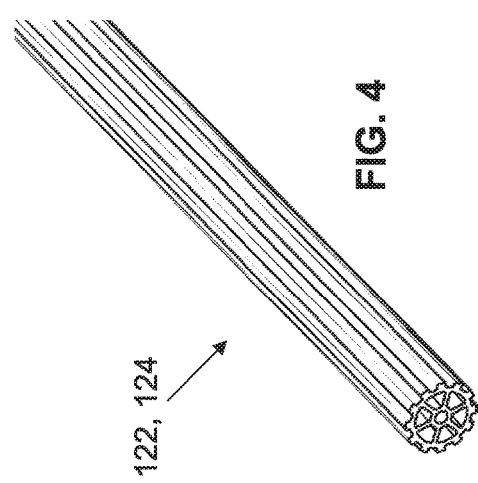
FIG. 4 is a fragmentary, enlarged, perspective view of a portion of a frame rod of the system of FIG. 1.

An exemplary embodiment of the frame 120 of the system 100 comprises a set of modular connector rods 122, 124 and a modular set of interconnecting brackets 126, 128. Longitudinal rods 122 (e.g., two in number) extend along the longitudinal length of the system 100 and horizontal rods 124 (e.g., four in number) extend between the longitudinal rods 122. In an exemplary configuration, the exterior shape of the rods 122, 124 is in the form of a toothed spindle as shown in the enlarged view of FIG. 4. To decrease weight, interior sections are removed as shown. The toothed spindle or gear shape is only one exemplary embodiment for the exterior shape or cross-section of the rods. The rods can have an exterior shape or cross-section that is a circle, an oval, an ellipse, a stadium, a quatrefoil, a trefoil, a cinquefoil, a nephroid, a kidney, or an egg. The rods do not have to include curves, they can also have a polygonal shape, such as a triangle, a square, a pentagon, a hexagon, a heptagon, an octagon, a nonagon, and a decagon.

In an exemplary configuration, intermediate T-brackets 126 are hollow and have an interior circumference shaped to fit about the outside circumference of the connector rods 122, 124. In such a configuration, the T-brackets 126 can slide upon the two opposing connector rods 122 to intermediate positions and, when having an interior shape keyed on the teeth of the rods 122, the T-brackets 126 can orient the internal leg of the T towards the other opposing internal leg of the T-bracket 126 to, thereby, receive therein respective ends of one horizontal rod 124. With one intermediate horizontal rod 124, the frame 120 is H-shaped (which is not illustrated). With two intermediate horizontal rods 124 (and two sets of T-bracket pairs), the frame 120 takes on the shape shown in FIGS. 1 and 2, referred to herein as a double H-shape. When the frame 120 is so configured, respective sets of setscrews 190 can lock each of the T-brackets 126 onto the two longitudinal and two horizontal rods 122, 124 to fix the double H-shape.

The double H-shape configuration defines a rectangular or square interior in which can be disposed a storage bin 130. For positive locking of the storage bin 130 on the rods 122, 124, in an exemplary embodiment, wings 132 can extend from at least a portion of the sides of the storage bin 130. The wings 132 can be curved to extend around a portion of the circumference of the rods 122, 124. Additionally, if desired, the underside of the wings 132 can have a surface shape corresponding to the exterior shape of the rods 122, 124 (e.g., toothed).

Each of the longitudinal rods 122 can have caster-connection areas at which casters 140 are removably or fixedly connected. In an exemplary embodiment, the caster-connection area is a non-illustrated threaded bore into which a threaded screw 142 is threaded. A washer 144, which can be made of a hard or malleable material, can have a bore in which is disposed the screw 142 so that the washer 144 lies between the base of the screw 142 and the respective caster-connection area of the longitudinal rod 122. Like the wings 132, the washers 144 can have an upper surface that conforms to the exterior surface of the rod (e.g., teeth) and the lower surface can be of any shape that corresponds to the upper-facing surface of the caster frame 146 at the base of the screw 142. In the exemplary embodiment of the screw 142 shown, the upper-facing surface is flat. An installed orientation of the casters 140 with respective washers 144 is shown in the enlarged view of FIG. 3. In alternative or additional embodiments, the casters 140 can be connected to areas of any of the horizontal rods 124 and/or the T-brackets 126. By connecting the casters 140 at the T-brackets 126, the securing features of the casters (e.g., screws 142) can eliminate need for any of the washers 144 and/or the setscrews 190 to reduce part count. The casters 140 are spaced apart from one another such that when fully loaded, the entire system 100 is balanced and weighted to resist tipping or turning over.

Figure 5:
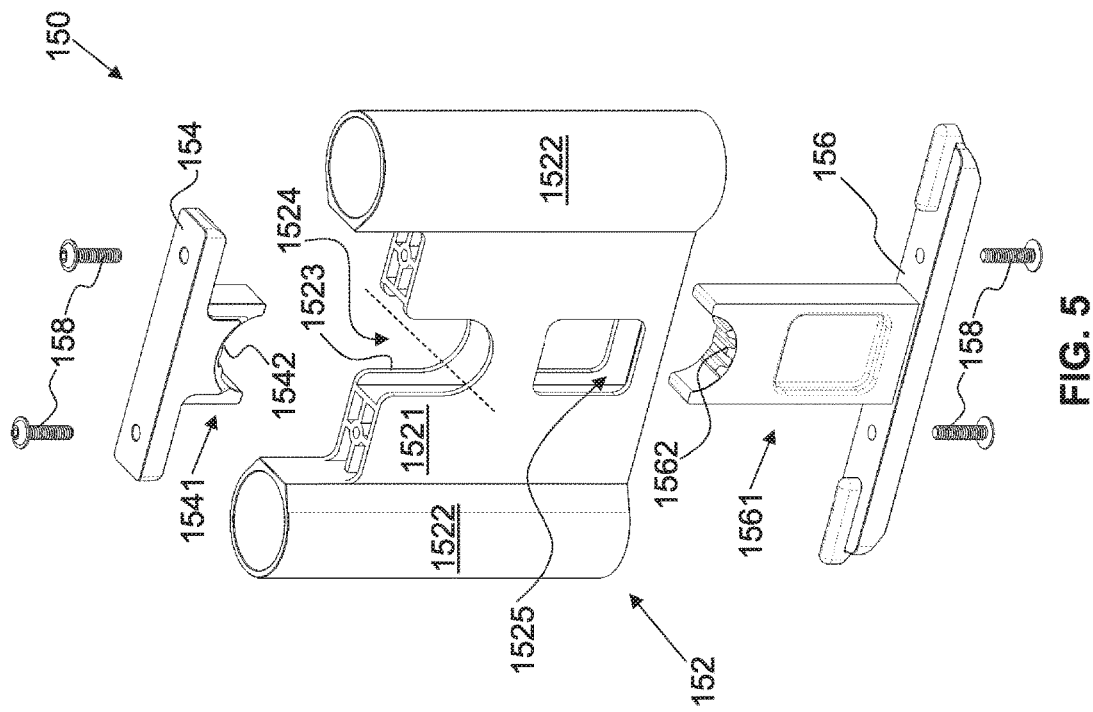
FIG. 5 is an exploded, perspective view of a dual-rod holder of the system of FIG. 1.

There are two rod-holder sub-assemblies that attach to either end of the frame 120. Each rod-holder sub-assembly comprises a horizontal rod 124' that, in a desirable exemplary embodiment, is identical to the horizontal rod 124. In such a case, manufacturing is easier and part count is reduced. Each rod-holder sub-assembly also comprises at least one dual-rod holder 150. The dual-rod holder 150 is modular and, therefore, in a desirable exemplary embodiment, two, three, or more dual-rod holders 150 can be fitted on each rod 124' of the rod-holder sub-assembly. The system depicted in FIGS. 1 to 3 shows the rod-holder sub-assembly having four of the dual-rod holders 150 spaced apart on the rod 124'. Not only does the modularity of the entire dual-rod holder 150 allow for minimal part counts, each of the parts for each dual-rod holder 150 is also modular, as is shown in FIG. 5, to further reduce parts count and cost.

The dual-rod holder 150 has a holder body 152 and opposing clamp pieces 154, 156, each of which are secured to the holder body 152 by a fastening mechanism. For example, the clamp pieces 154, 156 can be press-fit into the holder body 152, and/or they can be attached thereto by fasteners 158, such as screws or bolts, as in the exemplary embodiment shown. The holder body 152 has a central rib 1521 connecting opposing hollow rod tubes 1522, each of which have an interior cylindrical diameter sized to fit any handle of standard fishing rods, which can vary in diameter from 1 to 3 inches. Exemplary inner diameters of the rod tubes 1522 include 1.5", 1⅝", 1.75", 1⅞", and 2". The interior openings of the hollow rod tubes 1522 define a longitudinal direction of the dual-rod holder 150. The central rib 1521 has a longitudinal slot 1523 sized and shaped to fit the exterior circumference of the rod 124' therein perpendicular to the exterior opposing outer surfaces of the rib 1521. The longitudinal slot 1523 is offset from a center of the holder body 152 so that, when installed about the rod 124', a center of gravity of the holder body 152 is below the rod 124', thereby allowing the rod-holder assembly to be in a self-righting state at all times, which keeps rod tips pointed upward and substantially safe from harm when a rod is placed within the rod tube(s) 1522. The rib 1521 also defines top and bottom interior openings 1524, 1525 sized to fit rod-clamping portions 1541, 1561 of the clamp pieces 154, 156 therein. If desired, the bottom area of the rib 1621 adjacent the bottom interior opening 1525 for the lower clamping portion 1561, can be weighted to provide a further ability to self-right and/or, the bottoms of the rod tubes 1522 can be weighted, either integrally or separately, for example, by providing heavy outer rims at the rod tubes 1522 adjacent the lower clamping portion 1561, or the lower clamping portion 1561, itself, can be weighted, integrally or separately, or made of a material that is heavier than the material of the rod tubes 1522 or the rib 1521.

The upper clamp piece 154 has a body that is to be connected to the central rib 1521 at the top surface of the rib 1521 (i.e., the upper side in FIG. 5) through fasteners 158, desirably, in the form of screws or bolts as shown. The rod-clamping portion 1541 of the upper clamp piece 154 has a central stub that extends away from the body to end in a rod-retaining feature 1542 that is shaped to mate with the exterior surface of the rod 124'. In the exemplary embodiment of the toothed spindle, the rod-retaining feature 1541 has a circular and toothed shape that corresponds and mates with an outer circumferential portion of the rod 124'. The lower clamp piece 156 has a body that is connected to the central rib 1521 at the bottom surface of the rib 1521 (similarly through fasteners 158 in the form of screws or bolts). The lower clamp piece 156 has a central stub that extends away from the body to end in a rod-retaining feature 1562 that is shaped to mate with the exterior surface of the rod 124'. In the exemplary embodiment of the toothed spindle, the rod-retaining feature 1562 has a circular and toothed shape that corresponds and mates with an outer circumferential portion of the rod 124'. In the orientation shown, the upper clamp piece 154 inserts into the rib 1521 from above and the lower clamp piece 156 inserts into the rib 1521 from below. The tolerance of the clamp pieces 154, 156 with respect to one another are set such that, when fully fastened by the fasteners 158 against the top and bottom surfaces of the rib 152, the rod-retaining features 1541, 1561 fixedly clamp upon the rod 124' and prevent the dual-rod holder 150 from sliding on the rod 124', rotating about the rod 124', or being removed therefrom. When partially fastened, in comparison, loose fitting of the rod-retaining features 1541, 1561 allows the dual-rod holder 150 to slide along the rod 124' and, depending on the amount of fastening, to not rotate about the rod 124'. If rotation-preventing features (e.g., teeth) are not present (which is not illustrated), then the dual-rod holder 150 can also rotate about the rod 124'.

In a desirable exemplary embodiment, the holder body 152 is extruded from aluminum and the ports receiving the fasteners 158 are able to be tapped to add an interior thread corresponding to the exterior thread of the fasteners 158.

As can be seen clearly in FIG. 2, dual-rod holders 150 can be placed upon the rods 124' in any number that is desired by a user. Of course, the width of the dual-rod holder 150 limits the maximum number of dual-rod holders 150 that can be added to each rod-holder sub-assembly but it is envisioned that at least one and even two, three, four, or more dual-rod holders 150 will be installed on each rod-holder sub-assembly.

The system 100 is configured to be mobile, as is evident from the casters 140. The frame sub-assembly is configured to have a low center of gravity and to be relatively close to the ground in order to prevent turnover or tipping. The rods 122, 124 have a ground clearance, for example, somewhere between 8" and 18". Accordingly, it is difficult for a person of average height to push the system 100 without bending over to an uncomfortable position. Accordingly, at least one handle is connected to the frame sub-assembly and extends away therefrom to give the user the ability to guide and move the system 100 from a comfortable height. An exemplary embodiment of such a handle is a handle sub-assembly 160, shown in an exploded view in FIG. 6. Although one of the handle sub-assemblies 160 can be attached to the frame sub-assembly for control and movement, an exemplary embodiment of four handle sub-assemblies 160 is shown in FIGS. 1 to 3. As will be explained in detail below, because each part of the handle sub-assembly is modular, a single set of parts can be used for each of the four corners of the frame sub-assembly. More specifically, the handle sub-assembly 160 comprises a telescoping handle, a handle rotation lock assembly, and a rod-holder lock assembly.

The telescoping handle comprises a grip 162, an inner tube 164, an outer tube 166, and a lock pin 168. The grip 162 is fixed onto the distal end of the inner tube 164 and is made, in an exemplary embodiment, of a material that is comfortable to grip and resists sliding by the user's hand when being gripped, such as neoprene. The inner and outer tubes 164, 166 telescope upon one another to enable a change in size. Here, the inner tube 164 projects from inside the distal end of the outer tube 166 and contains the grip 162, however, the tubes 164, 166 can, in an alternative embodiment, be reversed. To prevent the two tubes 164, 166 from sliding on one another without control, the outer tube 166 is provided with a set of ports 167 having a diameter sized to permit a lock pin 168 to extend therethrough from the inside of the outer tube 166. The lock pin 168 in this exemplary embodiment, is a spring-biased push-button fixed to the inner tube 164 and able to be pressed into the interior of the inner tube 164 to form an adjustable lock. With ports on various longitudinal positions and circumferential positions, the inner tube 164 is able to adjust both longitudinally and rotationally to place the grip 162 to any position away from the distal end of the outer tube 166 and at any angle about the circumference of the outer tube 166. With ports 167 spaced at 90-degree increments about the circumference of the outer tube 166 as in the exemplary embodiment shown, the grip 162 can be locked into four different orientations, each rotated 90 degrees from one another.

To connect the handle sub-assembly to the frame, a handle rotation lock assembly 170 is provided. The handle rotation lock assembly 170 comprises a rotatable handle mount 180, a handle lock knob 172, a handle lock ring 174, a mount fastener 176, at least one handle fastener 177, and a handle lock spring 178. To illustrate how the various parts 172, 174, 176, 177, 178 enable rotation of the outer tube 166 about a handle rotation axis 171, reference is made to FIGS. 7 through 10. The handle mount 180 comprises a tube receiver 182, a rotation sleeve 184, and a connection span 186 connecting the tube receiver 182 to the rotation sleeve 184. The tube receiver 182 defines an orifice in which a proximal end 169 of the outer tube 166 is received and fixed. At least one handle fastener 177 makes the fixed connection between the outer tube 166 and the tube receiver 182. In an exemplary embodiment, the fastener 177 can be a set of aluminum pop rivets that pass through both the thickness of the tube receiver 182 and the thickness of the outer tube 166.

The handle mount 180 is connected to a frame rod connector 200, which is part of a rod-holder lock assembly 190 that is described in further detail below, but some parts are described here. The frame rod connector 200 has an elbow shape and, on a side that is opposite the rod 124', a castellated boss 202 protrudes along the rotation axis 171 and is surrounded in part by an arm-travel-limiting wall 204. The outer circumference of the castellated boss 202 substantially corresponds to an inner circumference of a lock orifice 185, which is centrally disposed within the rotation sleeve 184. Play between the outer circumference of the castellated boss 202 and the inner circumference of the lock orifice 185 is determined by the materials forming the frame rod connector 200 and the handle mount 180 but, in general, it is sufficient to permit substantially free rotation of the rotation sleeve 184 about the castellated boss 202. If desired, an amount of friction can be included between the parts so that the tubes 164, 166 do not fall very fast when released. A shape of the castellations 203 on the boss 202 is, in an exemplary embodiment, substantially saw-tooth shaped. These castellations 203 are shaped to interact with correspondingly shaped castellations 175 on an interior surface of the handle lock ring 174. In this configuration, when the handle lock ring 174 is pressed against the boss 202, the castellations 203, 175 mesh and fit together to prevent any movement of the handle lock ring 174 with respect to the frame rod connector 200.

Figure 8:
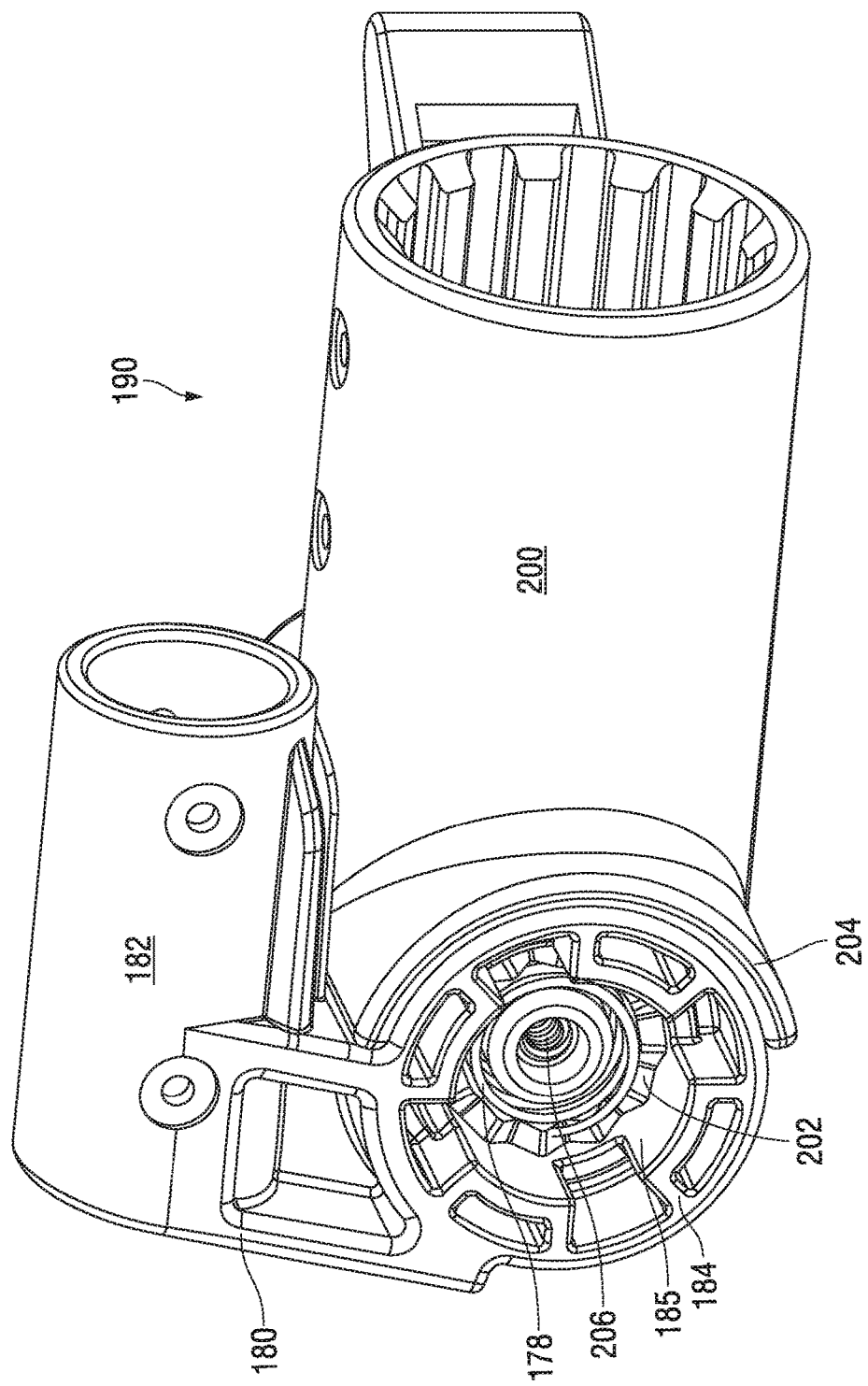
FIG. 8 is an enlarged perspective view of the rod-holder lock assembly and handle mount of FIG. 7 with a handle lock spring shown.
Figure 9:
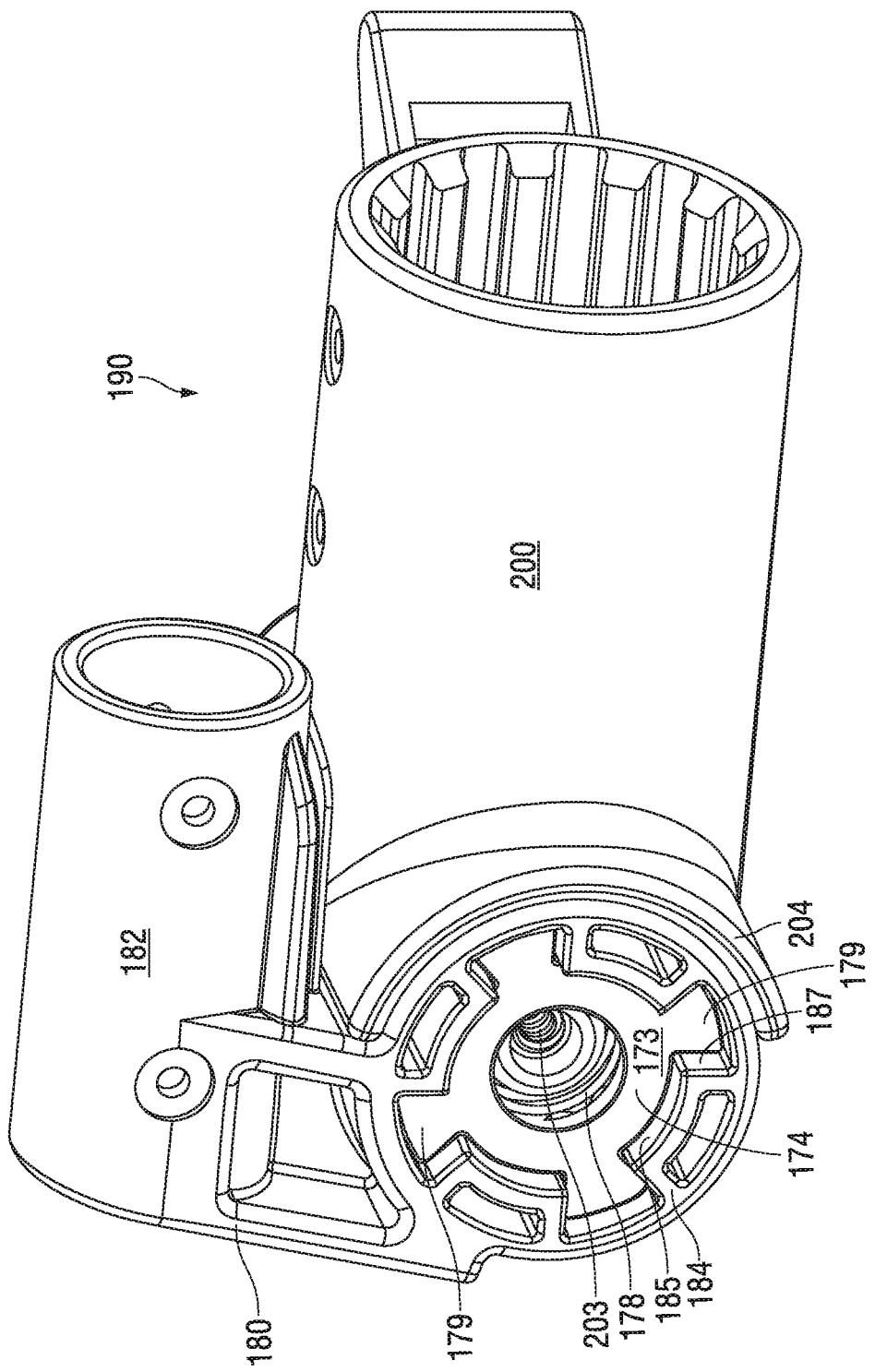
FIG. 9 is an enlarged perspective view of the rod-holder lock assembly and handle mount of FIG. 7 with a handle lock ring and the handle lock spring shown.
Figure 10:
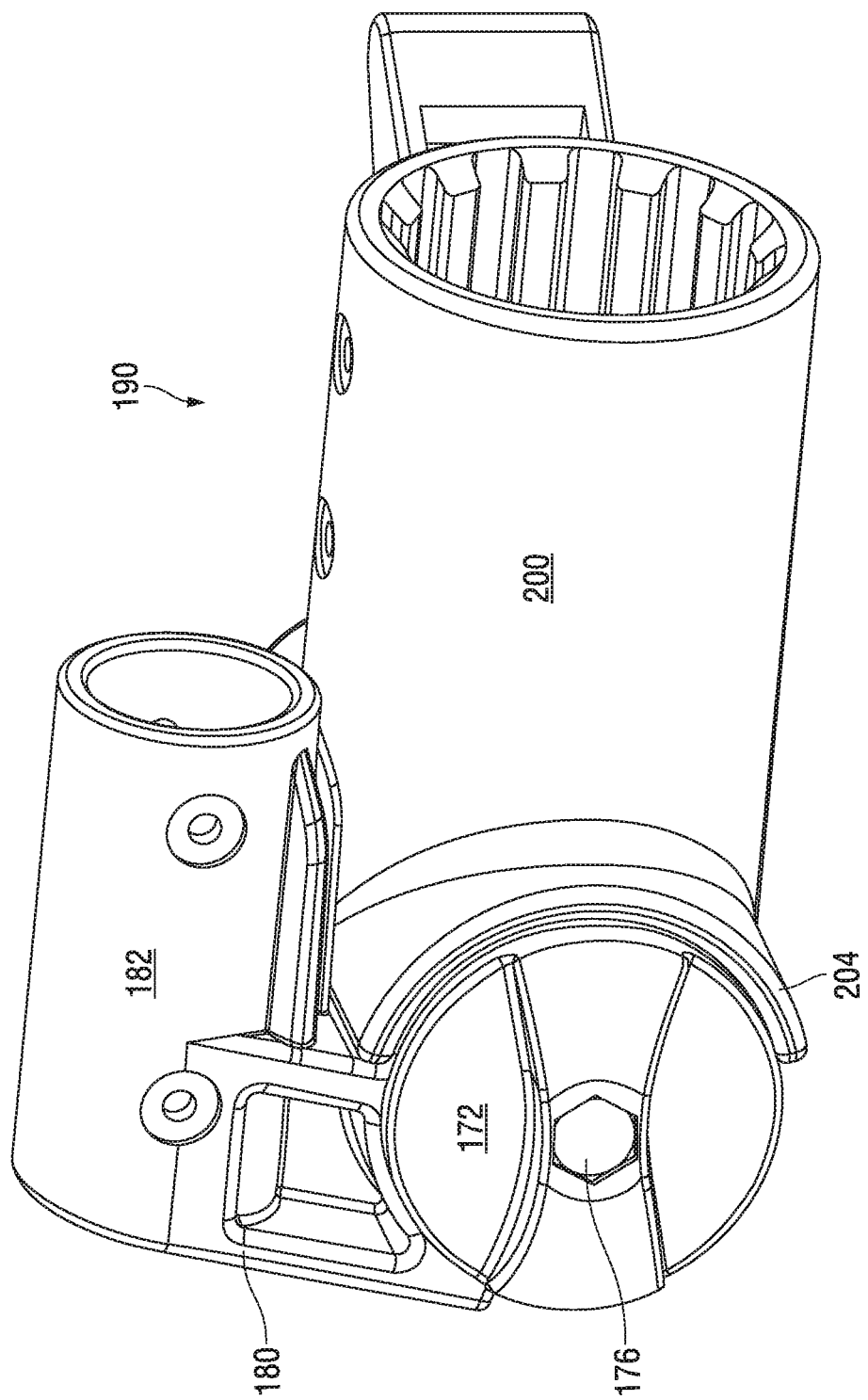
FIG. 10 is an enlarged perspective view of the rod-holder lock assembly and handle mount of FIG. 7 with a mount fastener and a handle lock knob shown.

Rotation of the handle lock ring 174 with respect to the rotation sleeve 184 is prevented by forming the handle lock ring 174 with at least one external projection 179 that extends into at least one corresponding orifice 187 of the rotation sleeve 184, which is shown best in FIG. 9. In this exemplary embodiment, the handle lock ring 174 has four projections 179 and the rotation sleeve 184 has four corresponding recesses 187. Because the handle lock ring 174 is keyed to the rotation sleeve 184 through the exterior projections 179, prevention of movement of the handle lock ring 174 means that rotational movement of the rotation sleeve 184 is likewise prevented. However, as the handle lock ring 174 is permitted to move away from the castellations 203 of the boss 202, the fit between the castellations 203, 175 is removed and, at a certain distance therefrom, the castellations 203, 175 no longer prevent rotation of the handle lock ring 174 with respect to the frame rod connector 200. Distance between the castellations 203, 175 is governed by an extent to which the handle lock knob 172 is pressing against the outer surface 173 of the handle lock ring 174, which outer surface 173 is on the side of the handle lock ring 174 opposite the castellations 175 and is shown in FIG. 9. As shown in FIG. 6, the handle lock knob 172 has an interior surface that protrudes into a portion of the outer surface of the handle lock ring 174 to center the two parts to one another. Each has a bore through which the mount fastener 176 passes. Threads of the mount fastener 176 engage corresponding threads 206 within a central bore 205 of the boss 202. In this way, unscrewing of the mount fastener 176 (in one direction) allows the handle lock ring 174 to move away from the boss 202 and screwing of the mount fastener 176 (in the opposite direction) presses the handle lock ring 174 against the boss 202 to engage the sets of castellations 203, 175 against one another, thereby preventing rotation of the rotation sleeve 184 about the boss 202. To ensure outward movement of the handle lock ring 174 away from the boss 202 when the mount fastener 176 and the handle lock knob 172 are unscrewed, the handle lock spring 178 is disposed about an interior portion of the boss 202 as shown in FIG. 8. The interior portion can be, in an exemplary embodiment, an annular groove 201 that is shown in the cross-section of FIG. 14. The handle lock spring 178 compresses as the mount fastener 176 and the handle lock knob 172 are screwed inwards towards the threads 206.

Figure 7:
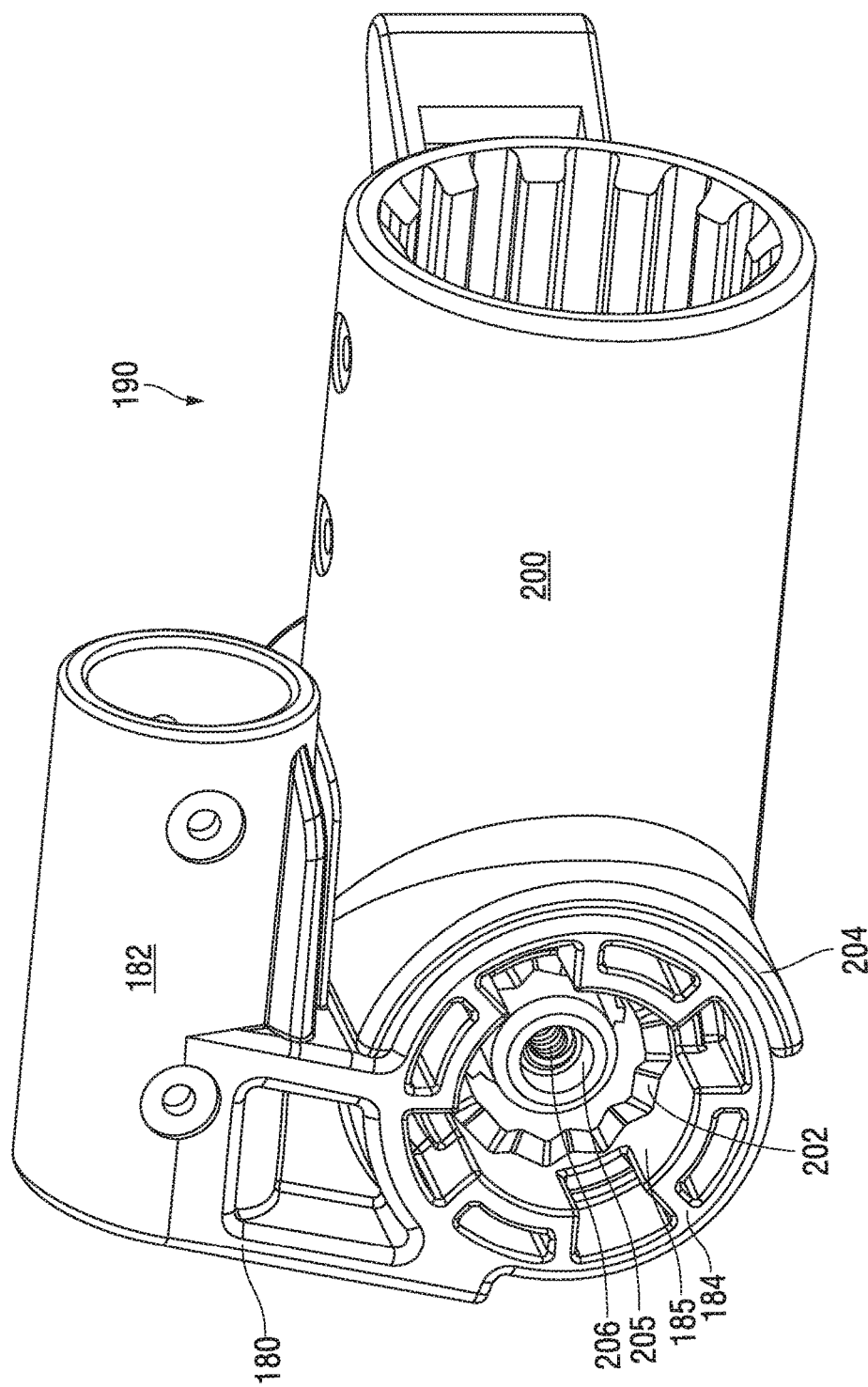
FIG. 7 is an enlarged perspective view of a rod-holder lock assembly and a handle mount of the handle sub-assembly of FIG. 6 with the handle mount in a handle-closed position and with various parts of the handle rotation lock assembly removed.
Figure 11:
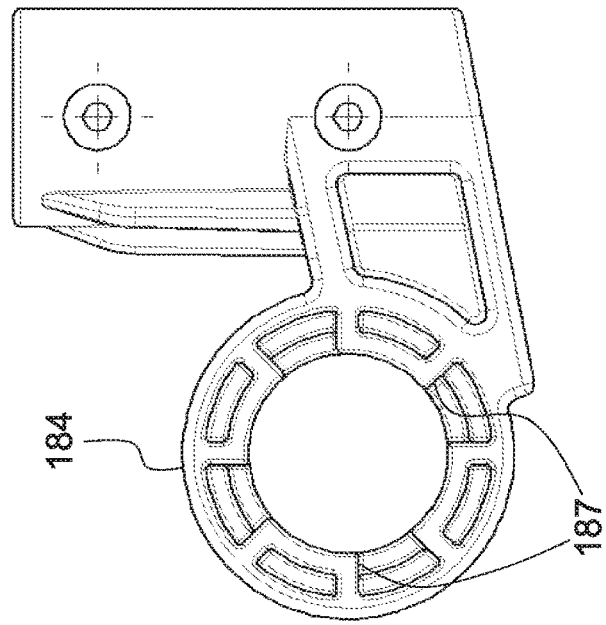
FIG. 11 is an elevational view of a right side of the handle mount of FIG. 6.
Figure 12:
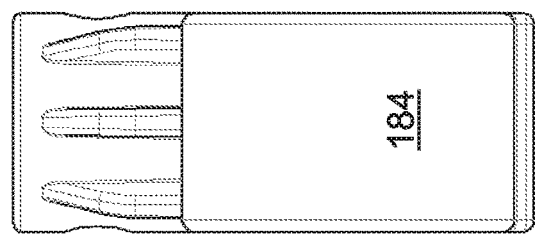
FIG. 12 is an elevational view of a bottom side of the handle mount of FIG. 6.
Figure 13:
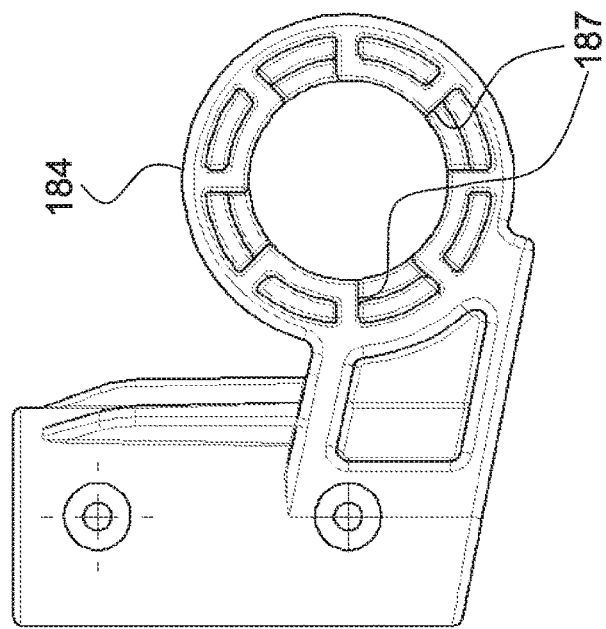
FIG. 13 is an elevational view of a left side of the handle mount of FIG. 6.

It is noted that the recesses 187, as shown in FIGS. 7 and 8, do not extend completely through the rotation sleeve 184 and, instead, only extend partially therethrough. This design is desirable to make the handle mount 180 modular and, with the same single part, able to fit both left and right orientations of handle sub-assemblies as depicted in FIGS. 1 to 3. The orientation of the recesses 187 on opposing sides are shown clearly in FIGS. 11 and 13 and the single handle mount 180 part is shown in both left and right orientations in the exploded view of FIG. 2.

As indicated above, the rod-holder lock assembly 190 comprises the frame rod connector 200. Attached to the frame rod connector 200 is a slider lock lever 220, a slider lock blade 230, a spring pin 240, and a lever lock spring 250. The frame rod connector 200 has an elbow shape to define two axes, a longitudinal rod axis 208 and a horizontal rod axis 210. In the exemplary configuration, the longitudinal rod axis 208 aligns with the central longitudinal axis of the longitudinal rod 122 and the horizontal rod axis 210 aligns with the central longitudinal axis of the horizontal rod 124'. In this configuration, a longitudinal bore 212 of the frame rod connector 200 is sized to fit snugly therein one end of the longitudinal rod 122 and a horizontal bore 214 of the frame rod connector 200 is sized to fit snugly therein one end of the horizontal rod 124'. As can be seen in FIGS. 14 to 21, the longitudinal bore 212 and the horizontal bore 214 have different interior surfaces. In particular, the horizontal bore 214 has a smooth interior surface. In comparison, the longitudinal bore 212 has a non-smooth or variegated interior surface. In the exemplary embodiment, the longitudinal bore 212 has a surface with an interior shape corresponding to the exterior shape of the longitudinal rod 122, e.g., it has a shape corresponding to the toothed spindle shape of the longitudinal rod 122 of FIGS. 1 to 4. By placing the longitudinal bore 212 and the horizontal bore 214 at a right angle (i.e., 90 degrees to one another), the frame rod connector 200 becomes a corner bracket of the frame 120. With suitable fasteners (e.g., set screws), the longitudinal rod 122 can be fixed inside the longitudinal bore 212. Alternatively, the ends of the longitudinal rod 122 can be shaped to press fit within the longitudinal bore 212. Other known measures for connecting the longitudinal rod 122 within the longitudinal bore 212 are equally possible.

As set forth above, it is desirable to allow the rod-holder sub-assembly, comprising the horizontal rod 124' and one or more dual-rod holders 150, to rotate about its axis (e.g., axis 210). If the interior surface of the horizontal bore 214 had the toothed shape of the longitudinal bore 212, then rotation would not be possible. Accordingly, the inside surface of the horizontal bore 214 is smooth, thereby permitting the toothed spindle shape of the horizontal rod 124' to freely rotate within the horizontal bore 214. Placing the frame rod connector 200 on each corner of the frame 120, completes the rectangle and forms a strong connection for the frame 120 while still permitting the rod-holder sub-assembly to freely rotate about the horizontal axis 214. However, it is desirable to control the free rotation of the rod-holder sub-assembly about the horizontal axis 214. This control is provided by the rotation control device of the rod-holder lock assembly 190, which comprises parts of the frame rod connector 200 as well as the slider lock lever 220, the slider lock blade 230, the spring pin 240, and the lever lock spring 250.

To attach the rotation control parts of the rod-holder lock assembly 190 to the frame rod connector 200, in an exemplary embodiment, the frame rod connector 200 has a lock slider rail 216 having a T-shape in cross-section. The lock slider rail 216 has a hollow interior in which is disposed a longitudinal extent 232 of the slider lock blade 230. The slider lock blade 230 has a connector arm 234 extending at an angle to the longitudinal extent 232, e.g., at ninety degrees. The connector arm 234 extends from inside the interior of the lock slider rail 216 out to the exterior of the lock slider rail 216 through a slot 217, which extends parallel to a direction of movement of the slider lock blade 230. Accordingly, control of the slider lock blade 230 within the lock slider rail 216 occurs at a connection located at an exterior distal end of the connector arm 234. This connection is formed, in the exemplary embodiment, by a bore in the connector arm 234 that is pierced through by the spring pin 240. The slider lock lever 220 is connected pivotally to the spring pin 240 so that it can move from a down position, shown in FIGS. 14 and 15 to a raised position, shown in FIGS. 16 and 17. As such, the slider lock lever 220 is able to rock about the spring pin 240 to a given extent. This given extent is large enough to move a locking boss 222 from a raised position, shown in FIGS. 20 and 21, to a lowered position, shown in FIG. 17 (which is a cross-sectional view through the locking boss 222). The locking boss 222 is moved between these two positions in order to move around a corresponding cam surface 218, which prevents the slider lock lever 220 from moving longitudinally along the lock slider rail 216 when the locking boss 222 is in the raised position, e.g., the position shown in FIGS. 20 and 21. In an unlocked position of the slider lock blade 230, the distal end 233 of the slide lock blade 230 rests within the interior of the lock slider rail 216. This unlocked position is visible in FIG. 14 and shown in FIG. 21. In a locked position of the slider lock blade 230, the distal end 233 of the slider lock blade 230 moves through a lock window 219 at the inside end of the interior of the lock slider rail 216 and into the interior of the horizontal bore 214. This locked position is visible in FIGS. 15 and 18 and a partially locked position is visible in FIGS. 16 and 17. When in the locked position, the distal end 233 of the slider lock blade 230 rests between two adjacent teeth of the toothed outer surface of the rod 124' (which are not shown). In such a configuration, the distal end 233 prevents any rotation of the rod 124' within the horizontal bore 214, thereby locking the entire rod-holder sub-assembly from movement about the horizontal axis 214.

The slider lock lever 220 has a second boss 224, shown in FIGS. 14 to 17 and 21. The second boss 224 is on a side of the rail portion of the lock slider rail 216 that is opposite the locking boss 222. In this way, the two bosses 222, 224 form two limit surfaces for rocking the slider lock lever 220 about the pivot of the spring pin 240. It is desirable to bias the slide lock blade 230 in either the locked or unlocked position. In the exemplary embodiment shown, the slide lock blade 230 is biased in the locked position. In particular, a lever lock spring 250 is disposed between a first surface of the interior of the lock slider rail 216 that is opposite the lock window 219 (e.g., to the left in FIG. 14) and a second, outer surface 227 of a spring arm 226, which arm 226 projects into the interior of the lock slider rail 216 in a direction towards the axis 208 of the longitudinal bore 212. The spring arm 226 is long enough to keep in direct contact with an interior end of the lever lock spring 250 (e.g., the right side of the spring 250 in FIG. 14), whether the slider lock lever 220 is in a raised orientation (shown in FIG. 16) or a lowered orientation (shown in FIGS. 14 and 15).

Figure 14:
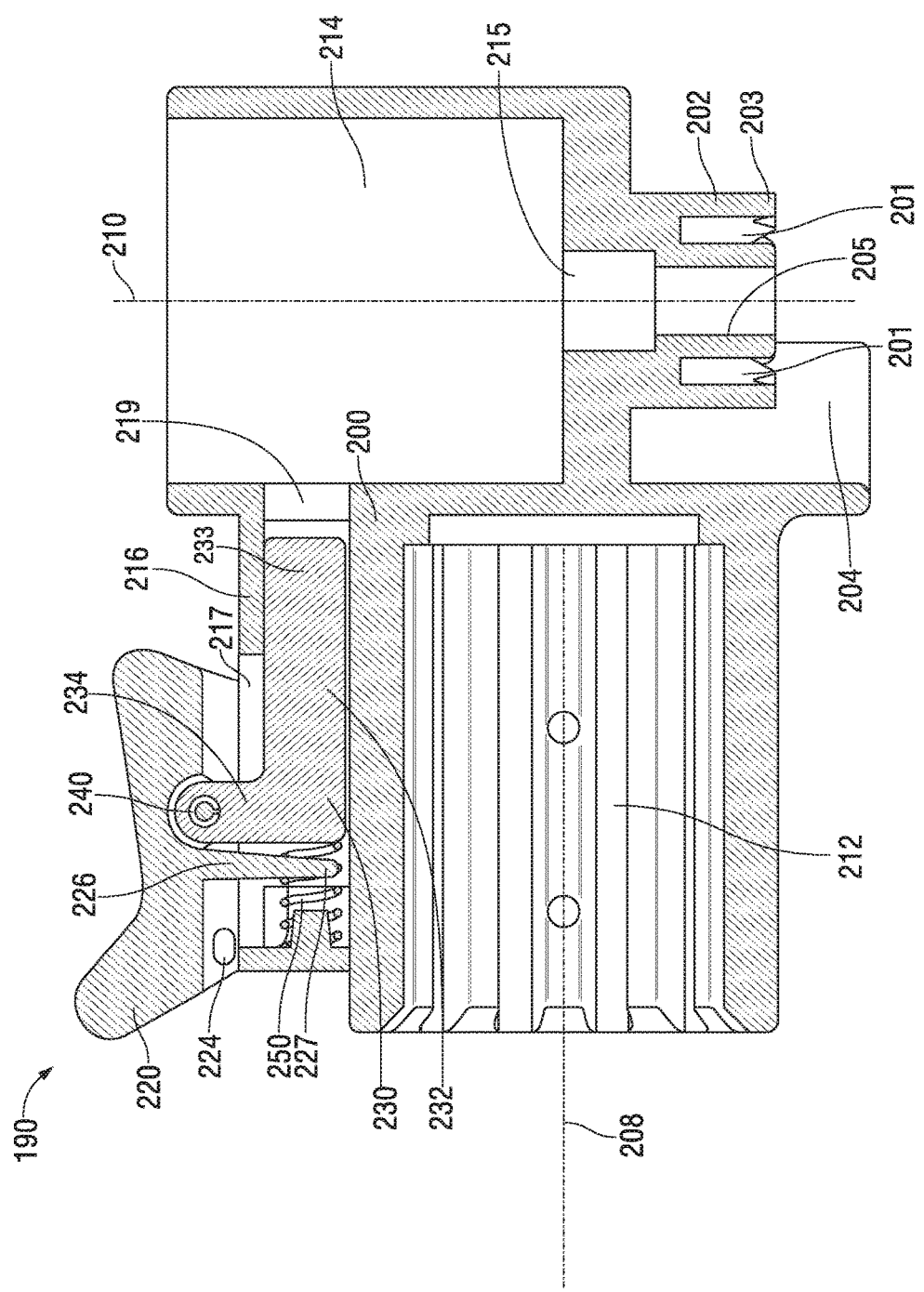
FIG. 14 is a central, cross-sectional view of the rod-holder lock assembly of FIG. 6 in an unlocked-and-loaded position.
Figure 15:
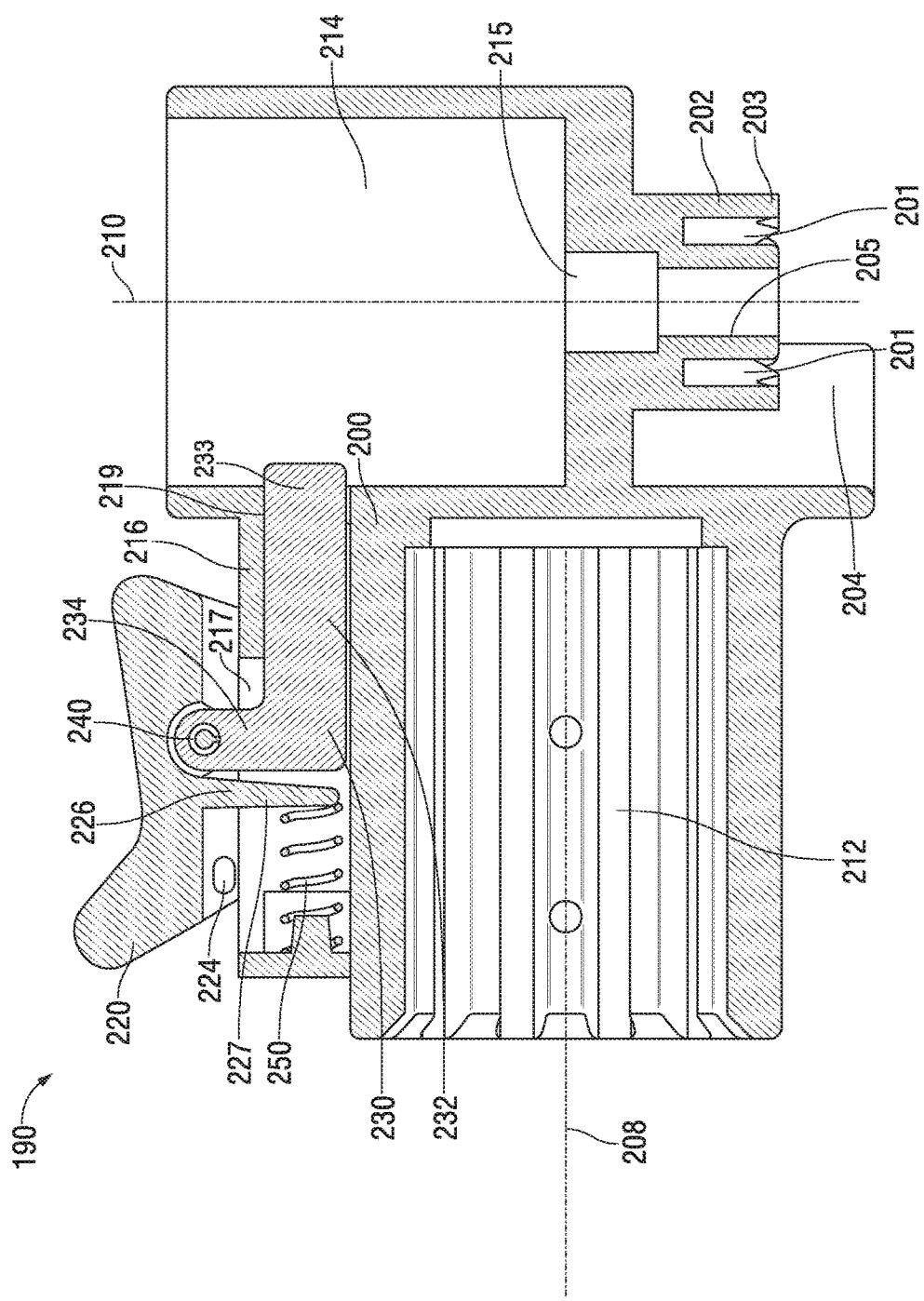
FIG. 15 is central, cross-sectional view of the rod-holder lock assembly of FIG. 6 in a locked position.
Figure 16:
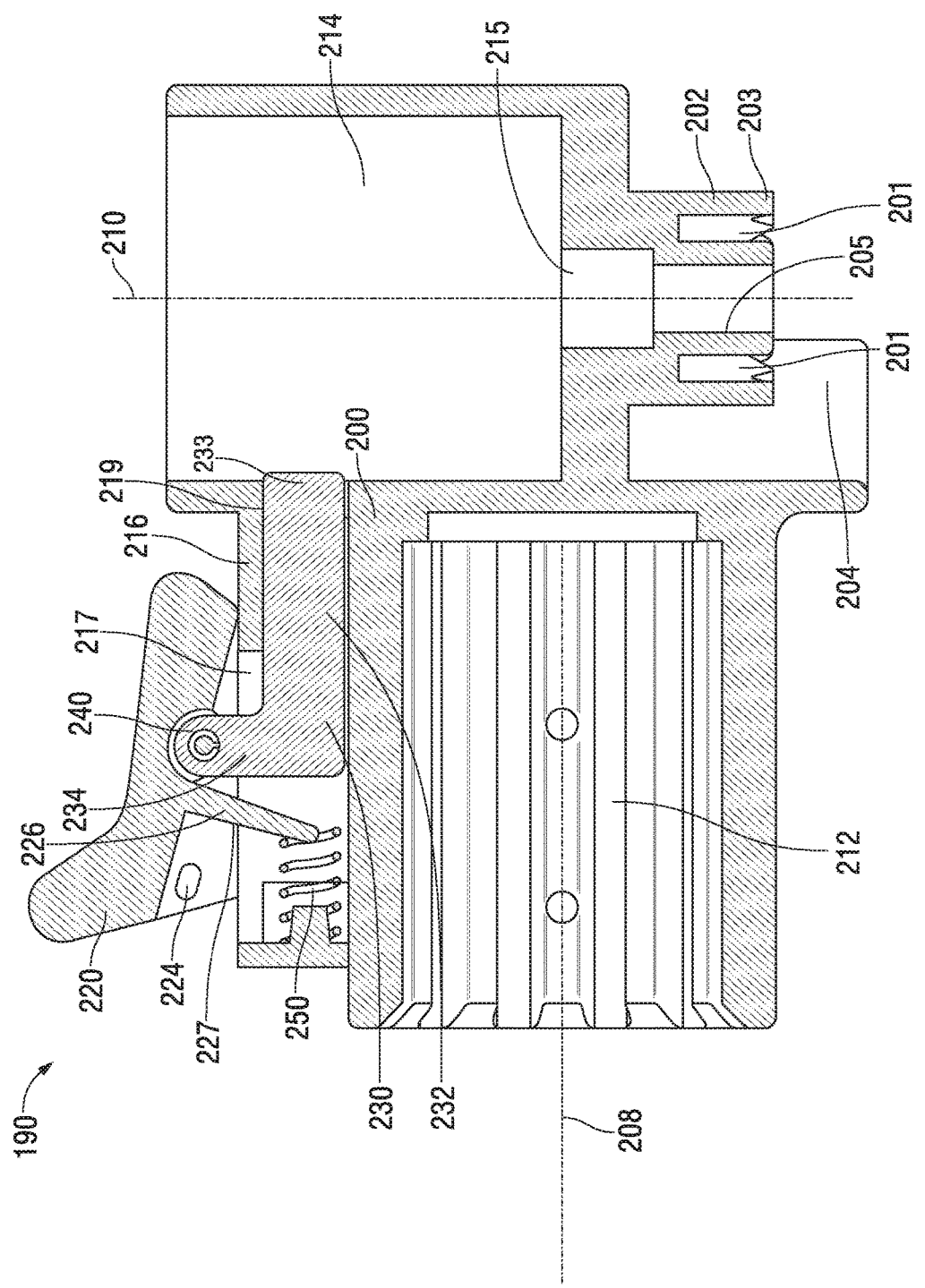
FIG. 16 is central, cross-sectional view of the rod-holder lock assembly of FIG. 6 in an intermediate position.
Figure 17:
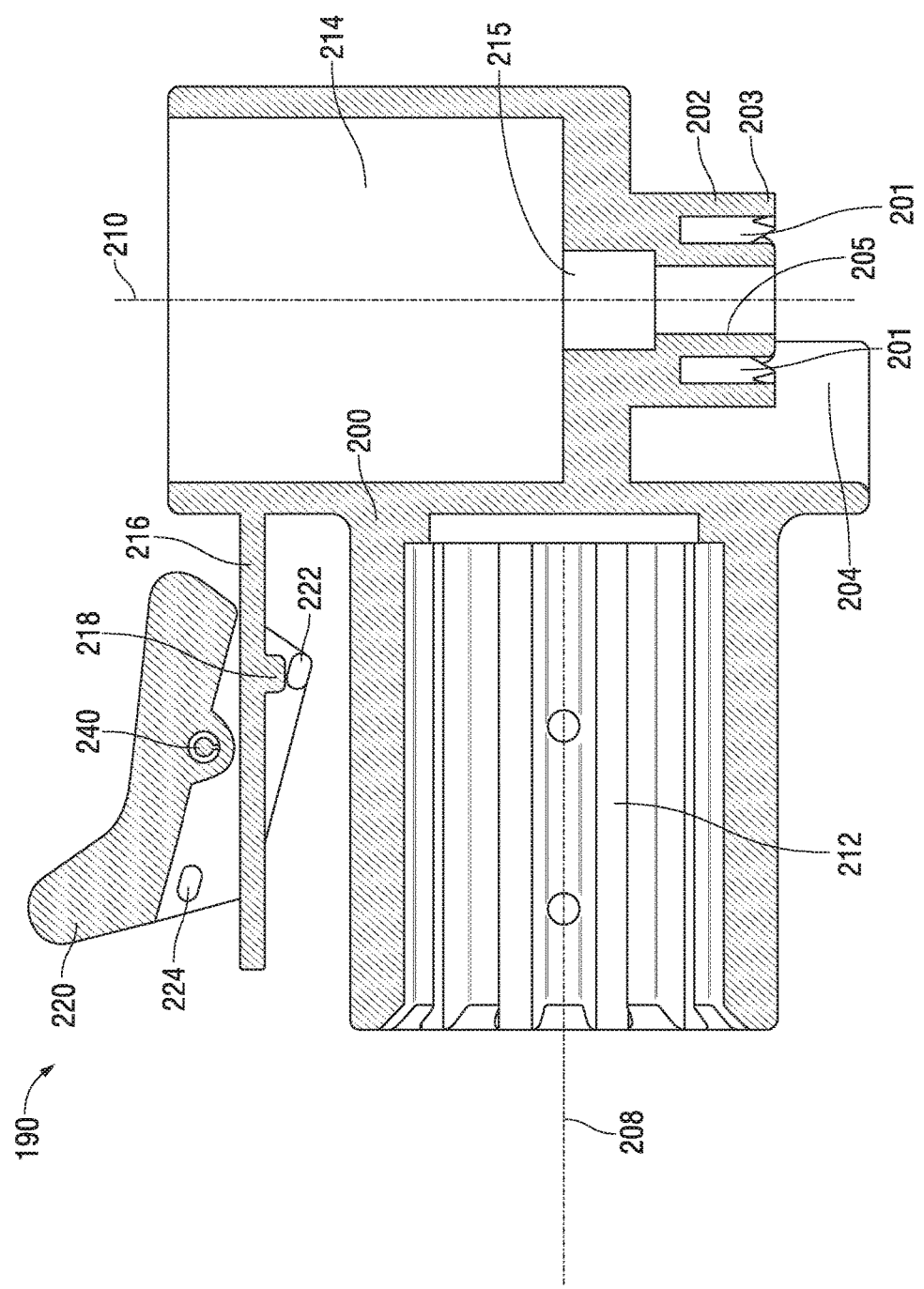
FIG. 17 is an offset-from-center, cross-sectional view of the rod-holder lock assembly of FIG. 16.
Figure 18:
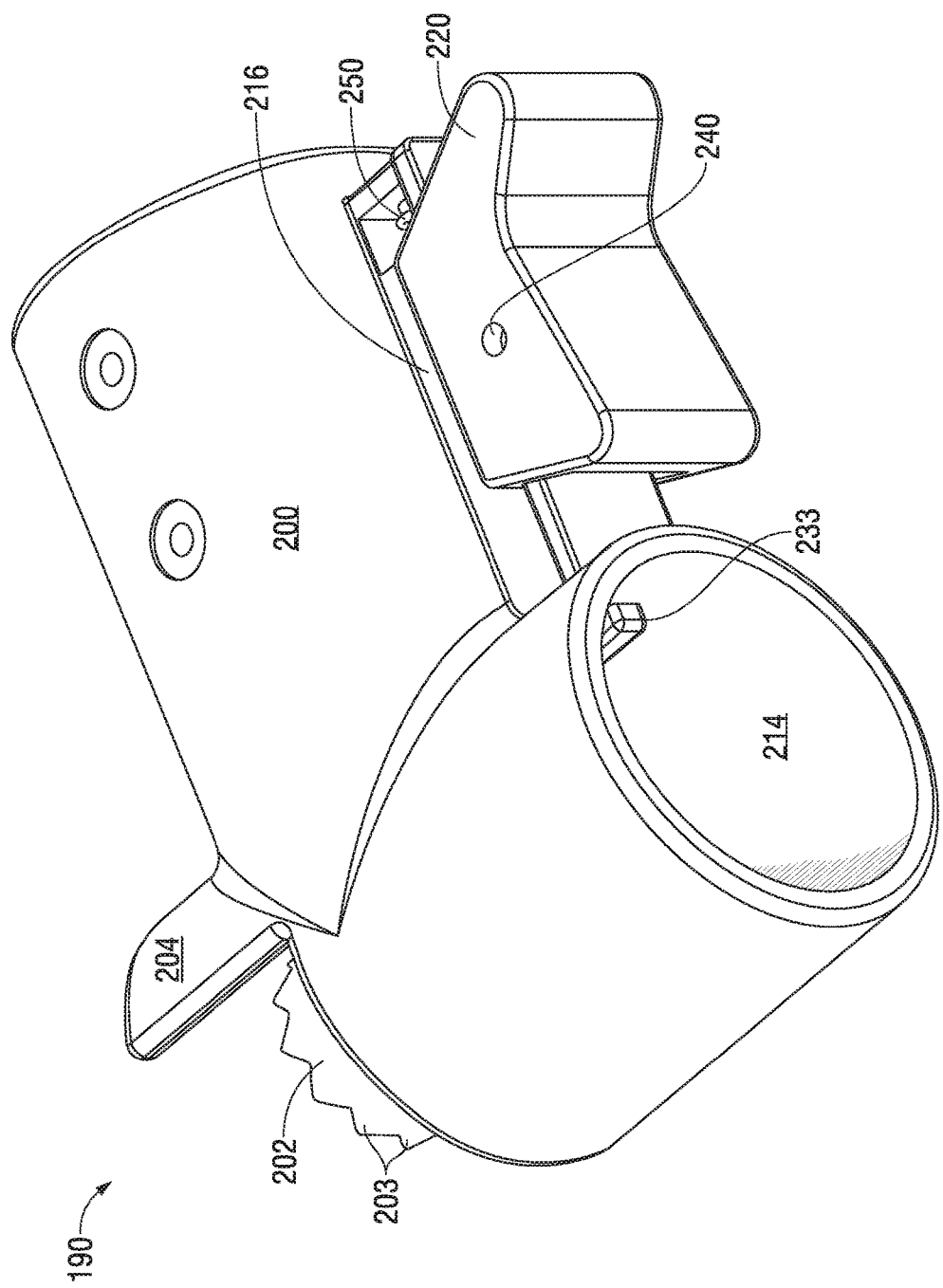
FIG. 18 is a perspective view of the rod-holder lock assembly of FIG. 15.
Figure 19:
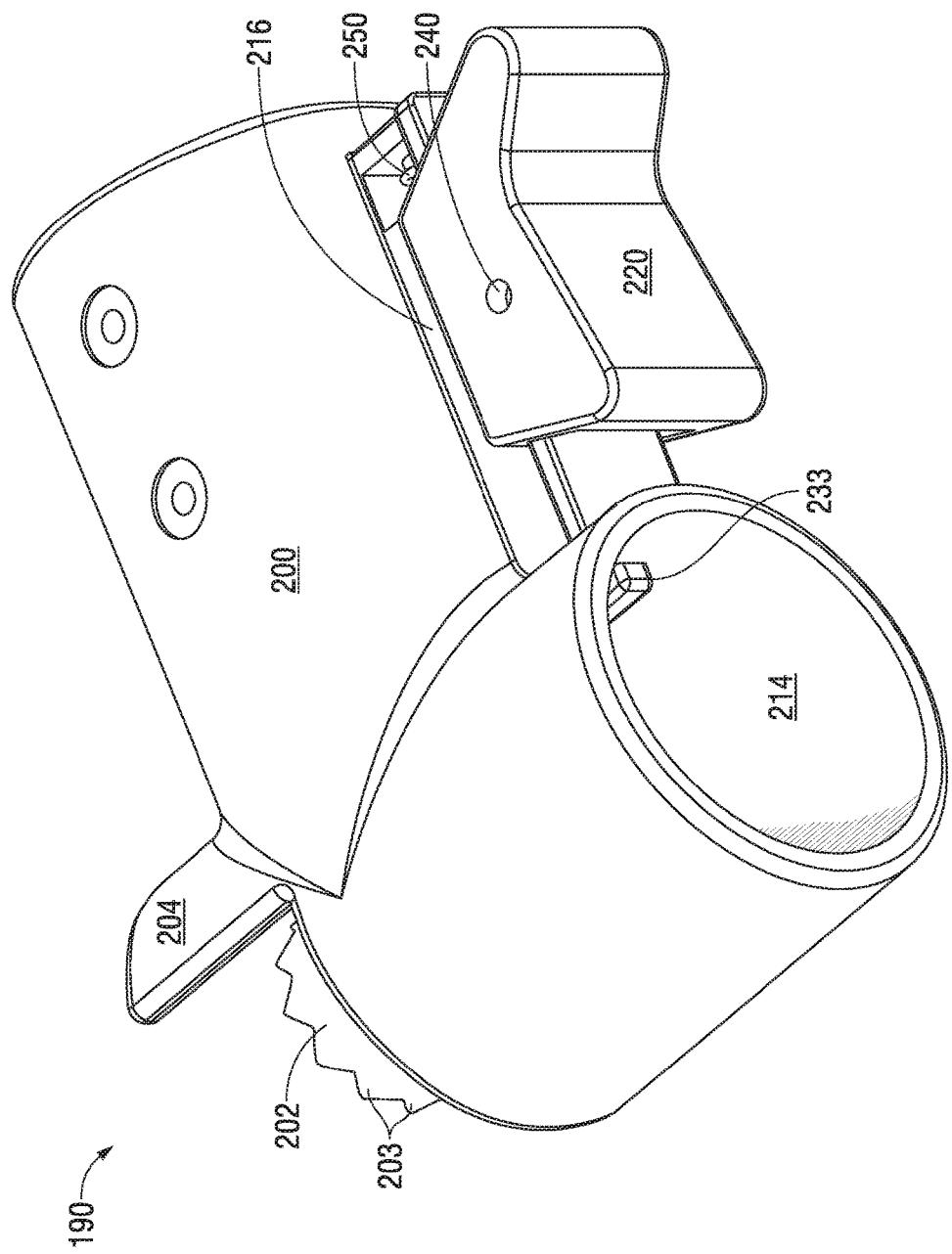
FIG. 19 is a hidden-line, perspective view of the rod-holder lock assembly of FIG. 15.
Figure 20:
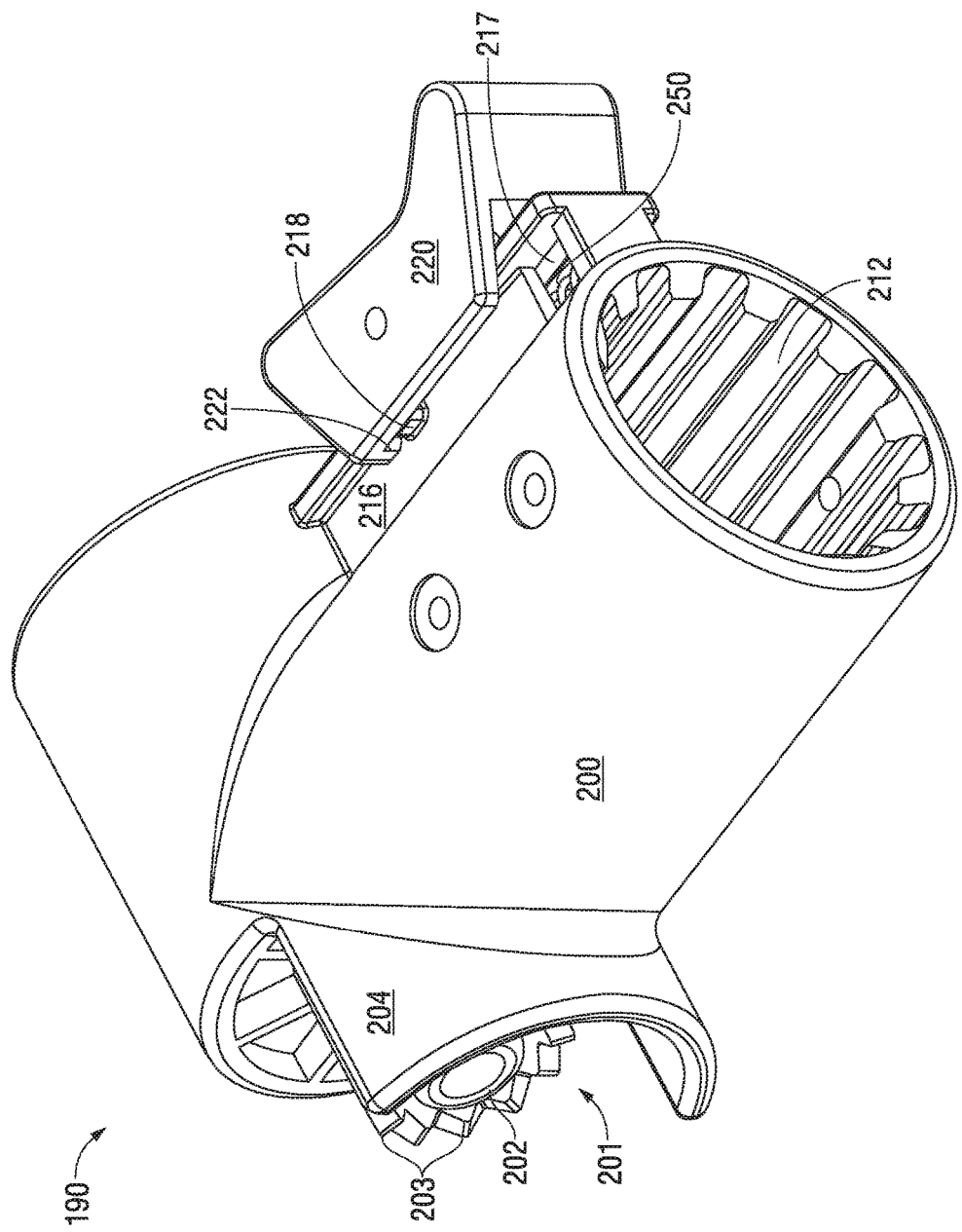
FIG. 20 is a perspective view of the rod-holder lock assembly of FIG. 15.
Figure 21:
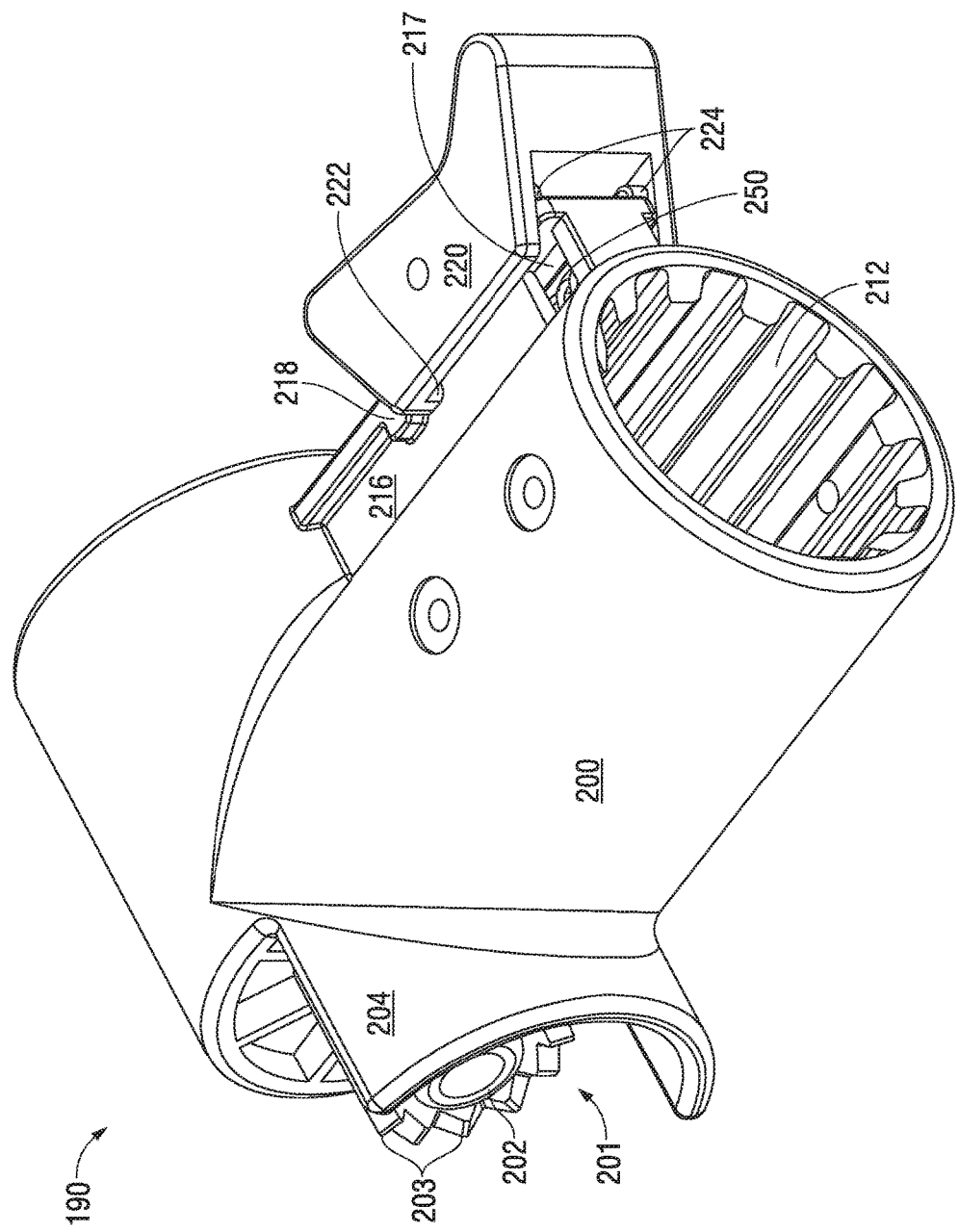
FIG. 21 is a perspective view of the rod-holder lock assembly of FIG. 14.
Figure 22:
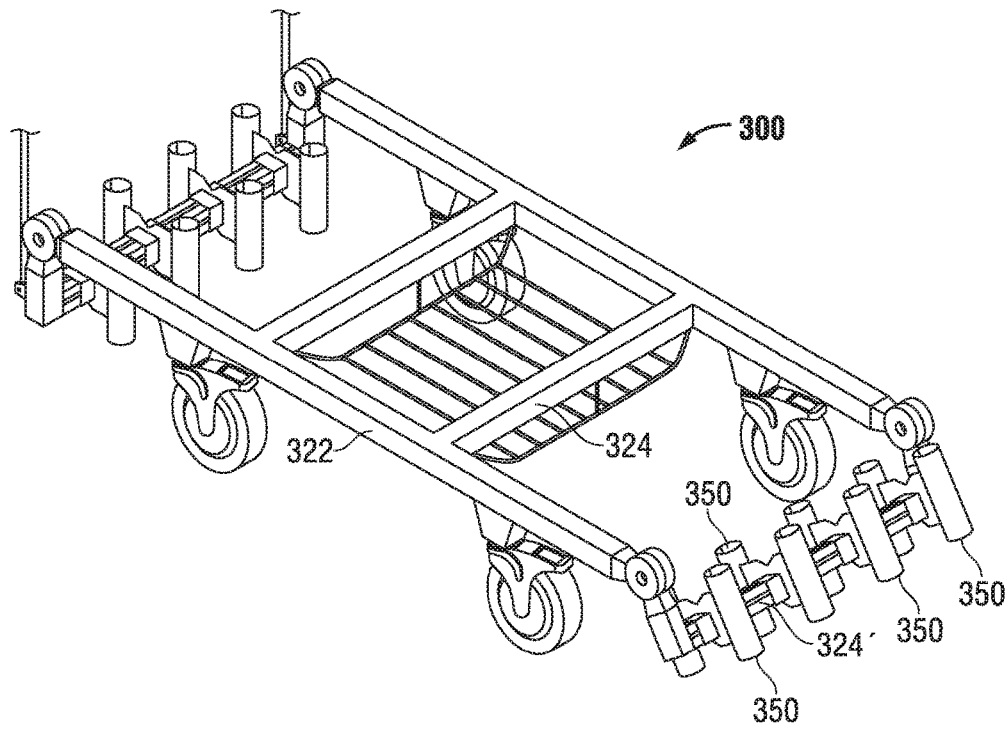
FIG. 22 is a perspective view of another exemplary embodiment of a mobile fishing rod transportation and storage system with handles raised and with dual-rod holders in different orientations.

This exemplary configuration of the rotation control parts of the rod-holder lock assembly 190 permits the user to operate the two slider lock levers 220 independently but also with one hand. When the user wants to allow the rod-holder sub-assembly to rotate within the horizontal bores 214 of opposing frame rod connectors, the user pivots the slider lock lever 220 to move the locking boss 222 away from the rail portion of the lock slider rail 216 (that shown in FIG. 16), slides the slider lock lever 220 away from the horizontal bore 214, and then pivots the slider lock lever 220 to move the locking boss 222 towards and against the rail portion of the lock slider rail 216. This position is shown in FIGS. 14 and 21 and is referred to as an unlocked-and-loaded position. The reason why it is called this is because the rod 124' of the rod-holder sub-assembly is unlocked to freely rotate within the horizontal bore(s) 214 but the slider lock lever 220 is loaded to spring back to its locked position merely by having the user toggle the slider lock lever 220 to move the locking boss 222 just far enough out of the way of the cam surface 218 to permit the lever lock spring 250 to spring shut the slide lock blade 230 through the lock window 219 and into a space between the teeth of the rod 124'. When that loaded state is activated, the slider lock lever 220 springs into the locked position, which is shown in FIGS. 15, 18, and 19. FIGS. 16 and 17 show the slider lock lever 220 in an intermediate position between the locked and unlocked-and-loaded positions.

As mentioned above, the rod-holder sub-assembly rotates freely within the horizontal bores 214 of opposing frame rod connectors when the slide lock blade 230 is moved out of the horizontal bore 214. Completely free rotational movement of the rod 124', however, is not desirable because it is possible for the rod 124' to rotate too fast and allow the fishing rods contained within the hollow rod tubes 1522 to sway wildly and, possibly, contact the environment and break or be damaged. To slow such rotational movement, and to center the rod 124' within the two opposing horizontal bores 214, a wavespring 260, shown in FIG. 1, is disposed between a respective distal end of the rod 124' and the bottom of each horizontal bore 214. Each wavespring 260, therefore, acts as a friction bearing and a centering mechanism (like a thrust washer).

At the end of the horizontal bore 214 at a center location is a counter-bore 215 that is formed to fit a separate part that comprises the threads 206. For example, the threads 206 can be a standard interior threaded stainless steel insert having an exterior that can be press fit into the bore 215 and the frame rod connector 200 is made of a material that is different from the stainless steel insert, for example, a plastic such as ABS, PTFE, PET, etc.

Figure 23:
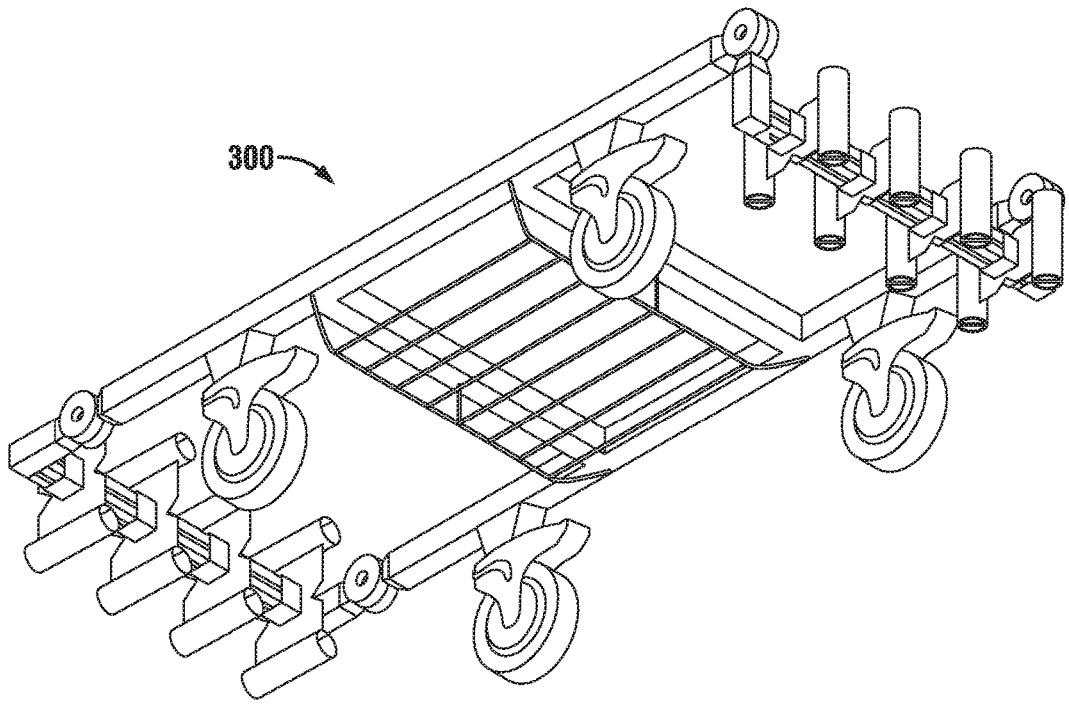
FIG. 23 is a perspective view of the system of FIG. 22 in a storage position lying on a longitudinal side thereof.
Figure 24:
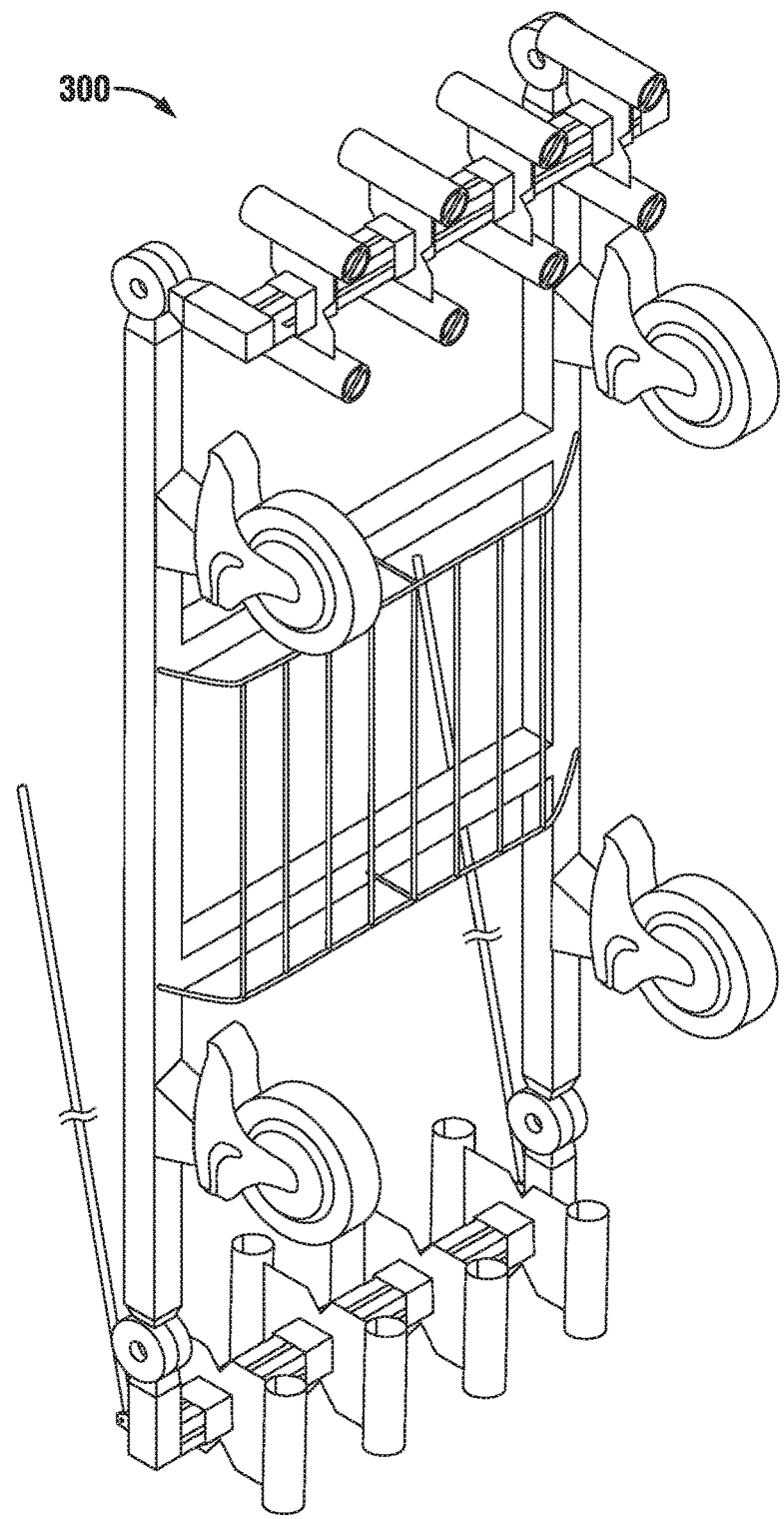
FIG. 24 is a perspective view of the system of FIG. 22 in a storage position lying on an end thereof.
Figure 25:
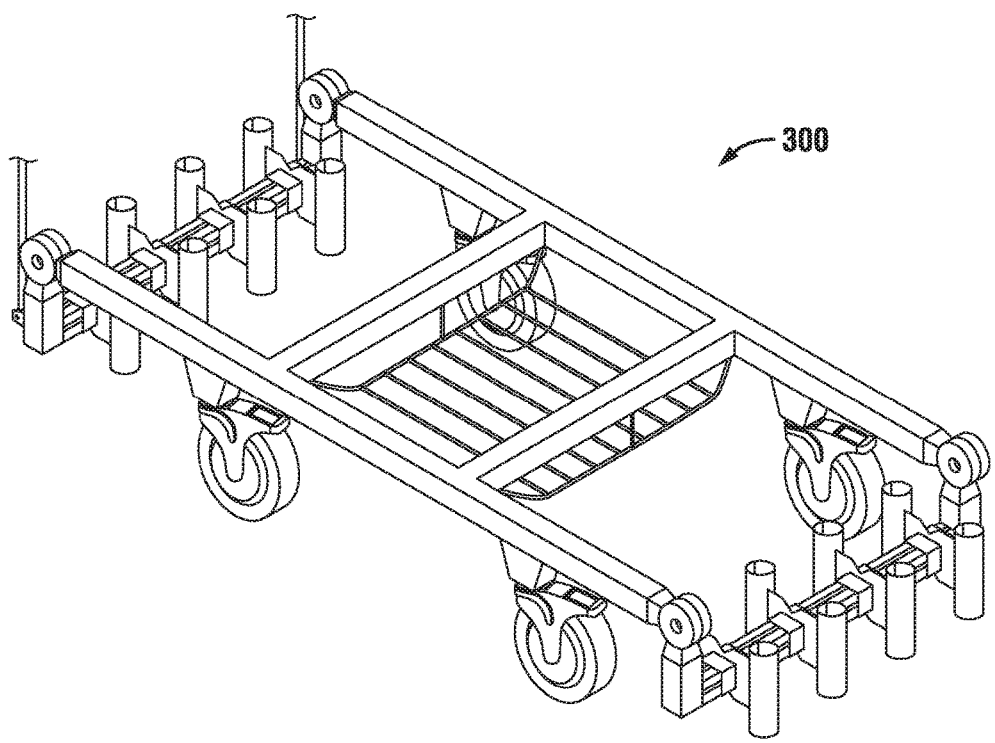
FIG. 25 is a perspective view of the system of FIG. 22.
Figure 26:
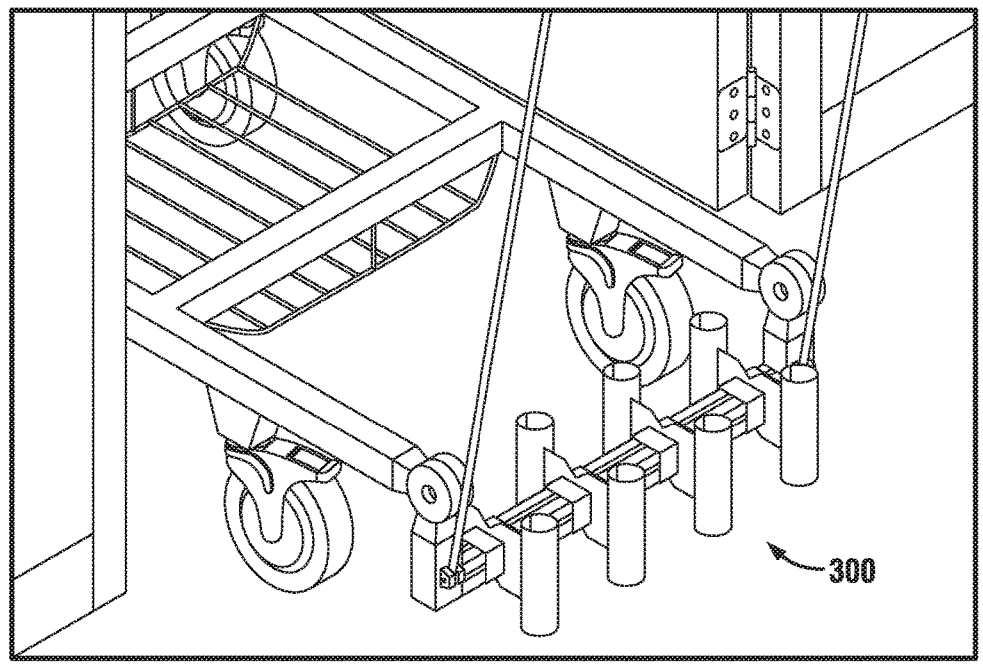
FIG. 26 is a fragmentary perspective view of the system of FIG. 22 partially within a standard door frame.
Figure 27:
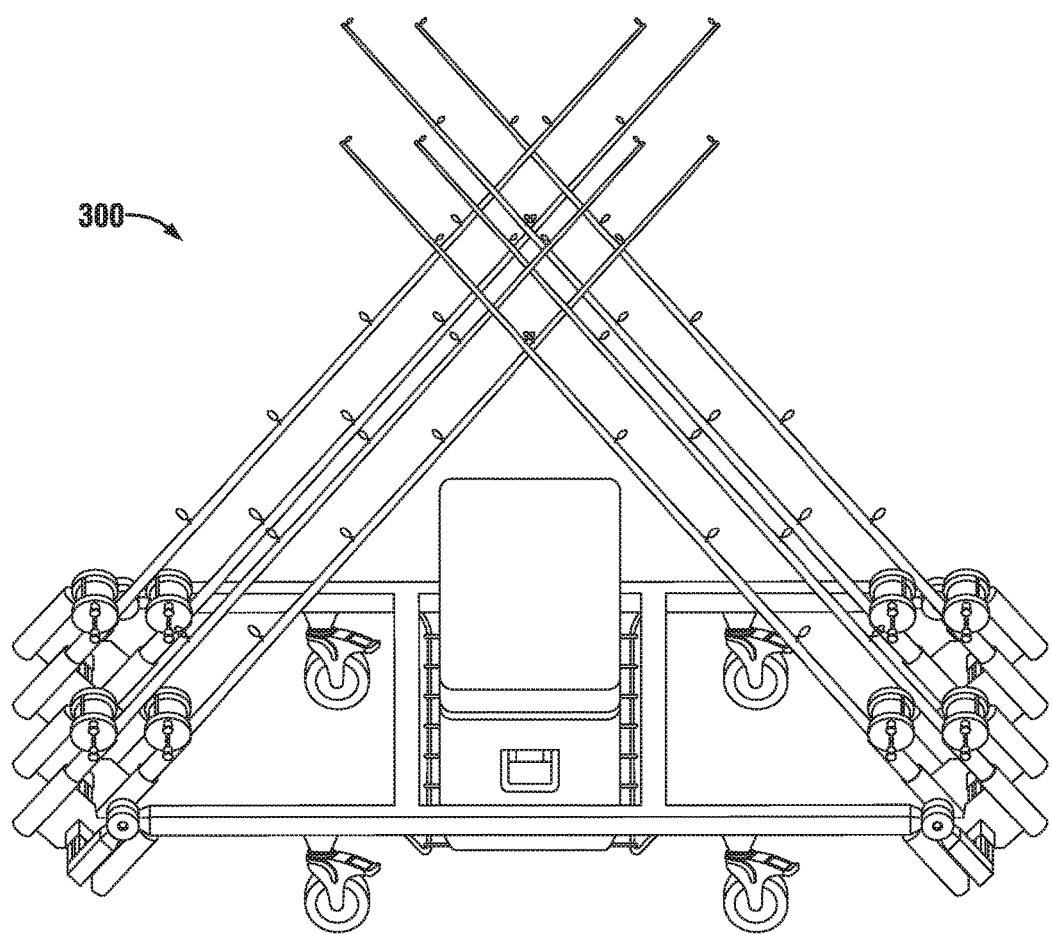
FIG. 27 is a side view of the system of FIG. 22 with dual-rod holders tilted towards one another.
Figure 28:
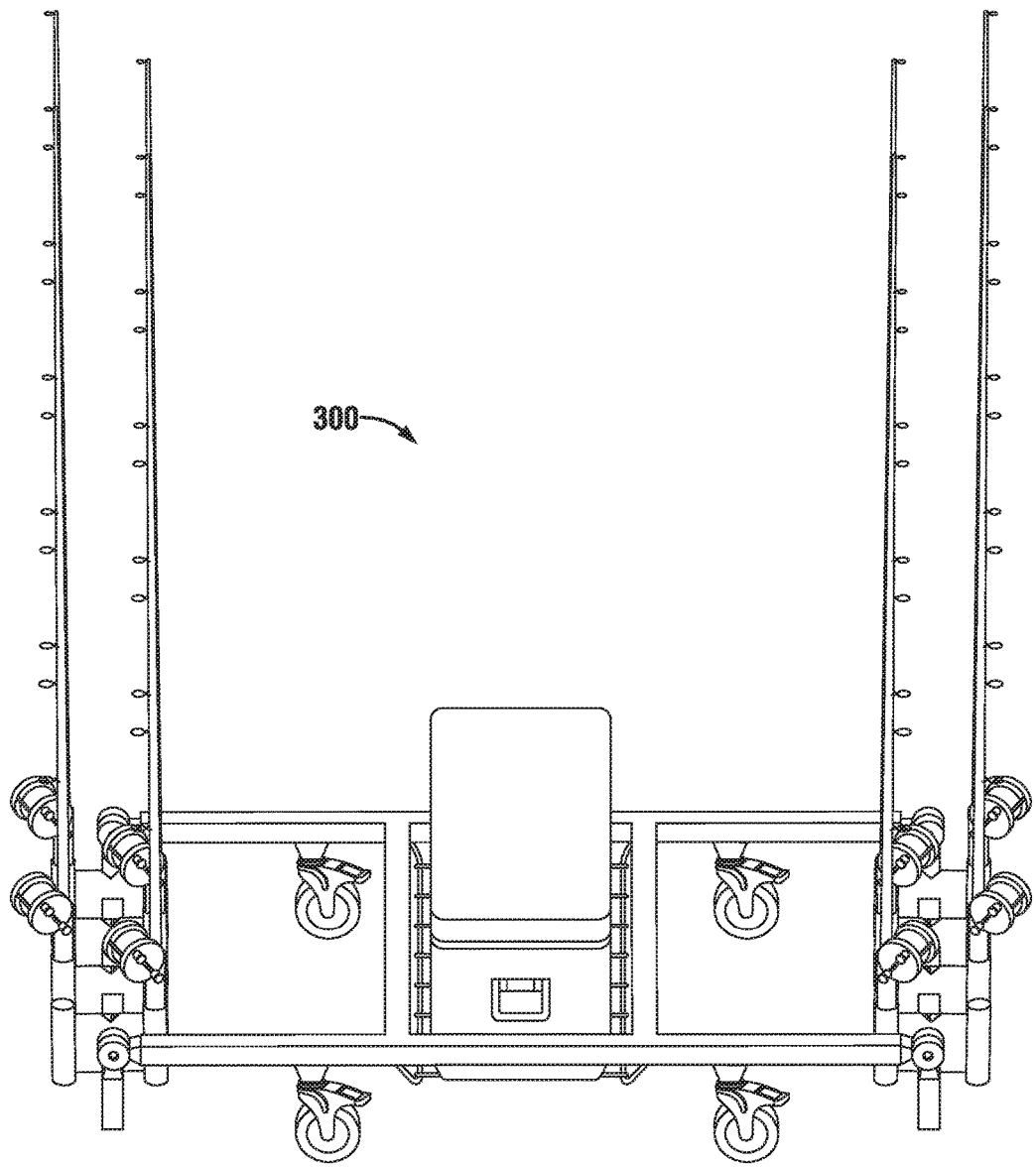
FIG. 28 is a side view of the system of FIG. 22 with dual-rod holders tilted vertically upwards.
Figure 29:
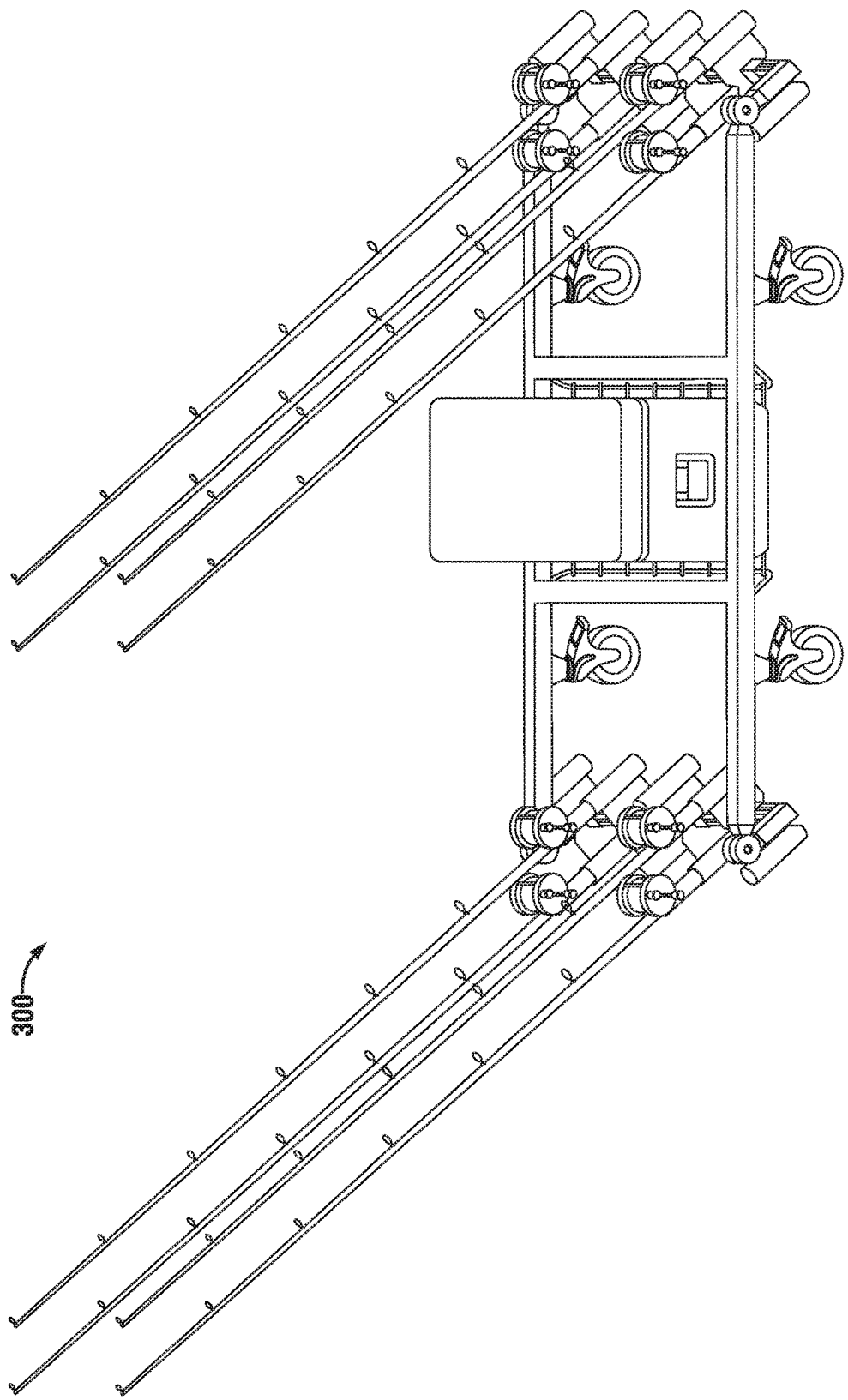
FIG. 29 is a side view of the system of FIG. 22 with dual-rod holders tilted parallel to one another in one direction.

FIGS. 22 through 26 show another exemplary embodiment of a mobile fishing rod transportation and storage system 300. This system 300 is made from standard aluminum extrusions. The longitudinal and horizontal rods 322, 324 are hollow square extrusions and the horizontal rods 324' are standard X-type extrusions that permit the dual-rod holders 350 to slide thereon and be attached thereto in any desired number. FIGS. 23 and 24 illustrate how the system 300 (and the systems 100, 400) can be stored on its longitudinal sides or on its end. FIGS. 25 and 26 show that the width of the system 300 (and systems 100, 400) is sized to fit through a standard door frame. FIG. 27 shows the system 300 with the dual-rod holders 350 angled to cross the rod tips. FIG. 28 shows the system 300 with the dual-rod holders 350 oriented to point the rod tips straight upwards. Finally, FIG. 29 shows the system 300 with the dual-rod holders 350 angled to align the rod tips parallel to one another in one longitudinal direction. In this orientation, the rods are lowered until the tips are all below the height of an average door. This allows transportation into any elevator, garage, home, or hotel entry door without the need to remove any rod.

As can be seen in FIGS. 22 through 29, the center area of the system 300 between the rods is shaped to carry coolers, tackle boxes, or other supplies.

Figure 30:
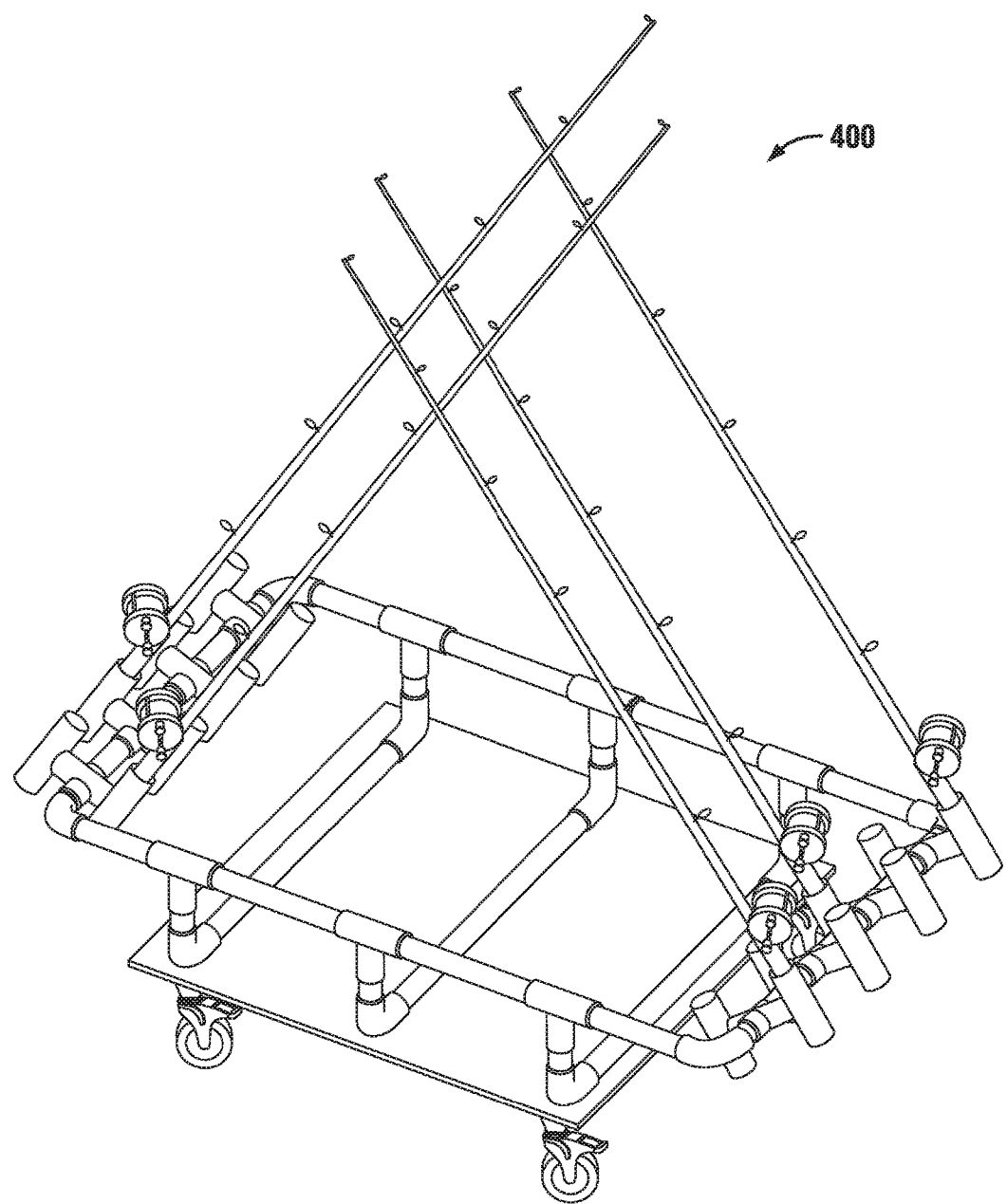
FIG. 30 is a perspective view of a further exemplary embodiment of a mobile fishing rod transportation and storage system with dual-rod holders tilted towards one another.
Figure 31:
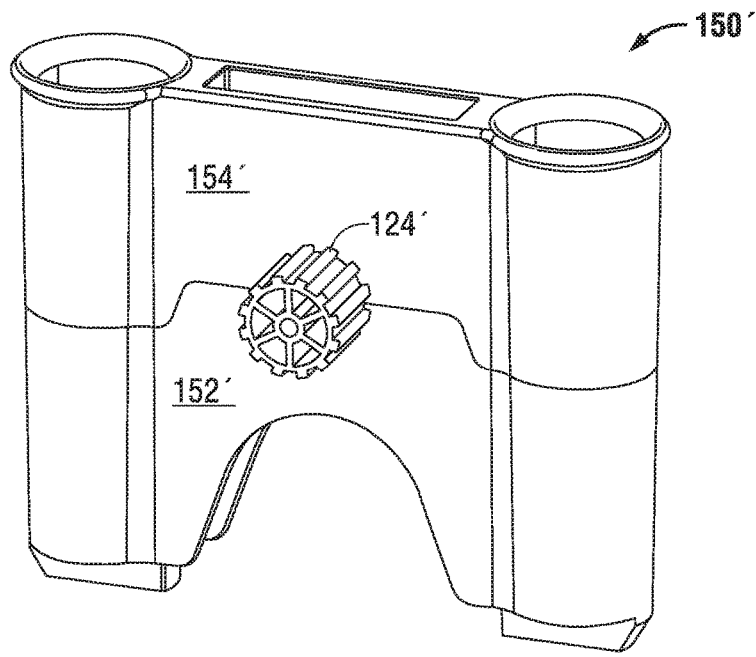
FIG. 31 is a fragmentary, perspective view of a further exemplary embodiment of a dual-rod holder installed on a connector rod.
Figure 32:
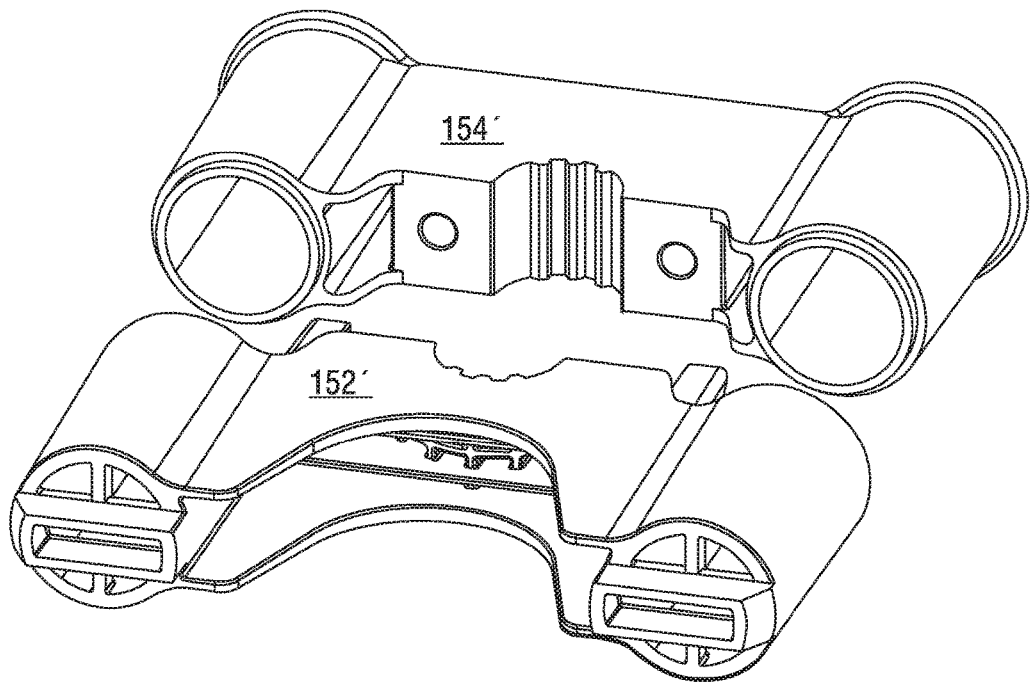
FIG. 32 is an exploded, perspective view of the dual-rod holder of FIG. 31 viewed from below with body half connection parts removed.
Figure 33:
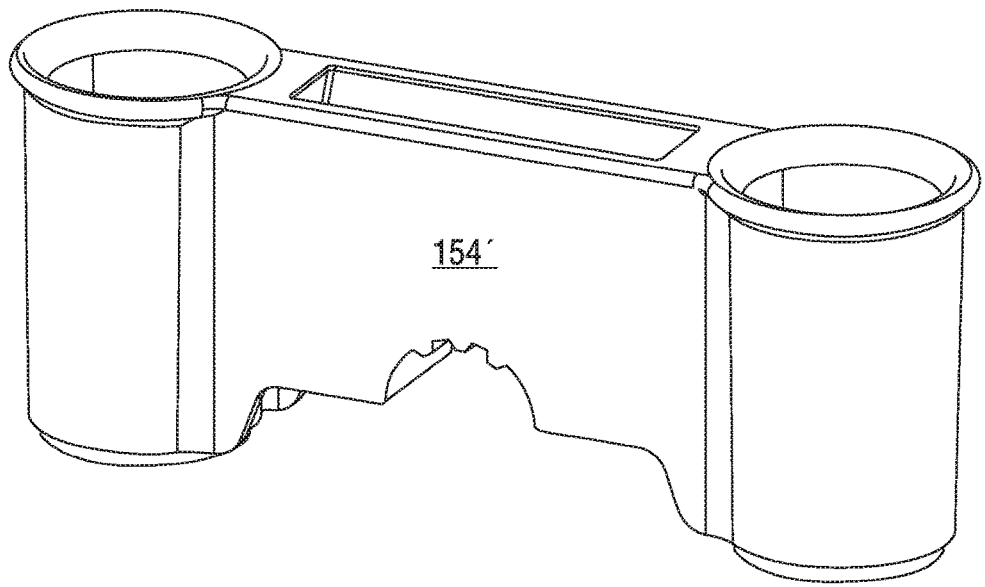
FIG. 33 is a perspective view of a top body half of the dual-rod holder of FIG. 31.
Figure 34:
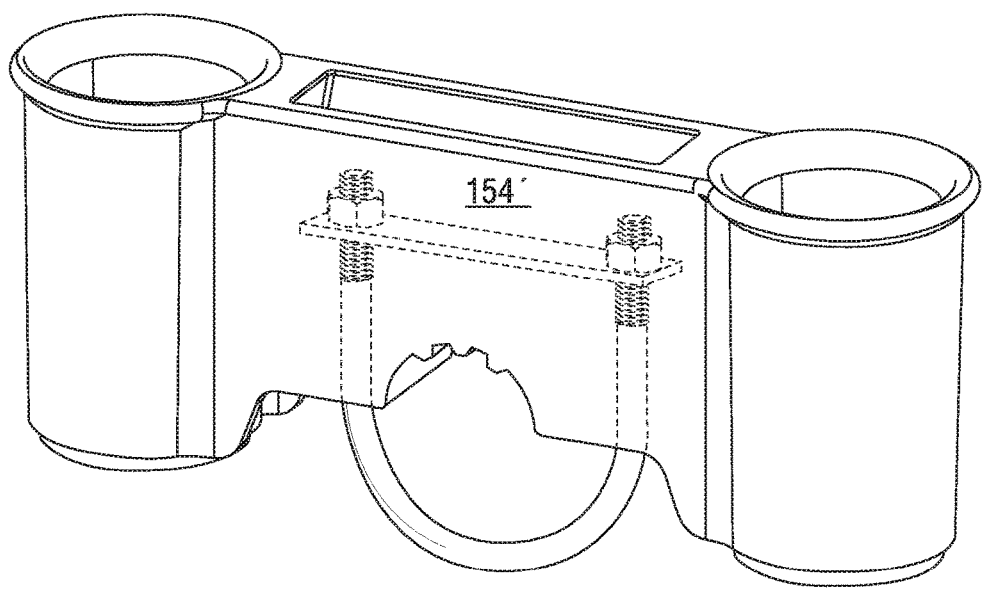
FIG. 34 is a transparent, perspective view of the top body half of the dual-rod holder of FIG. 31 with the body half connection parts.
Figure 35:
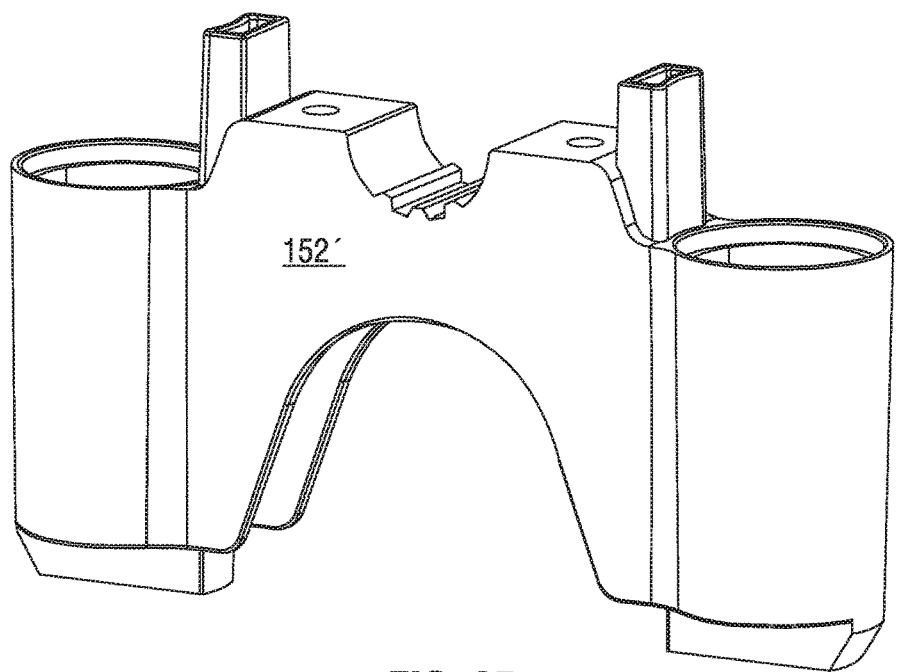
FIG. 35 is a perspective view of a bottom body half of the dual-rod holder of FIG. 31.
Figure 36:
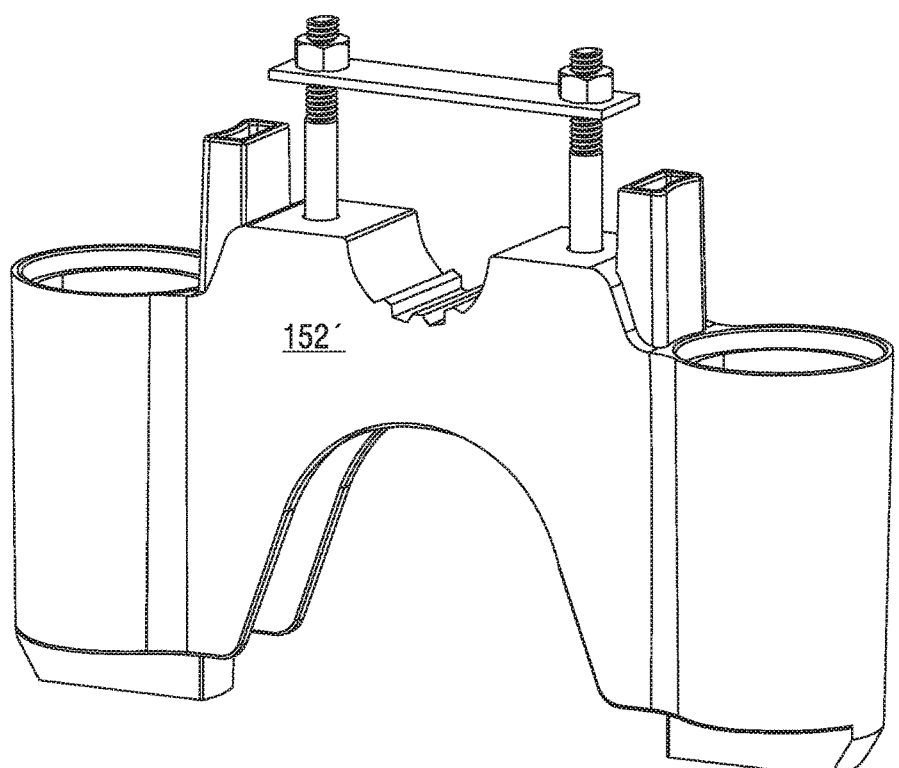
FIG. 36 is a transparent, perspective view of the bottom body half of the dual-rod holder of FIG. 31 with the body half connection parts.
Figure 37:
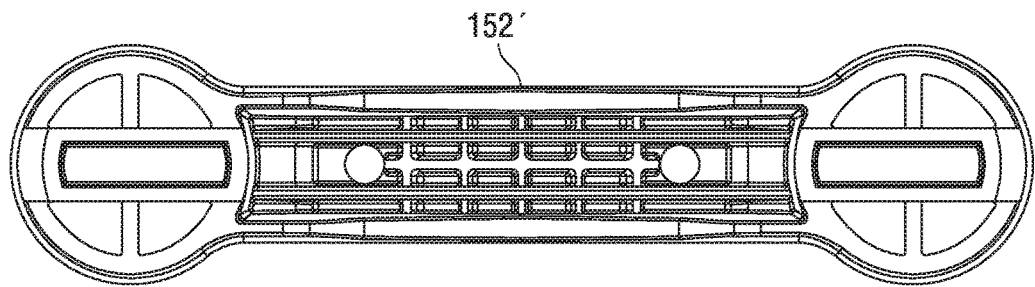
FIG. 37 is a bottom plan view of the bottom body half of the dual-rod holder of FIG. 31.
Figure 38:
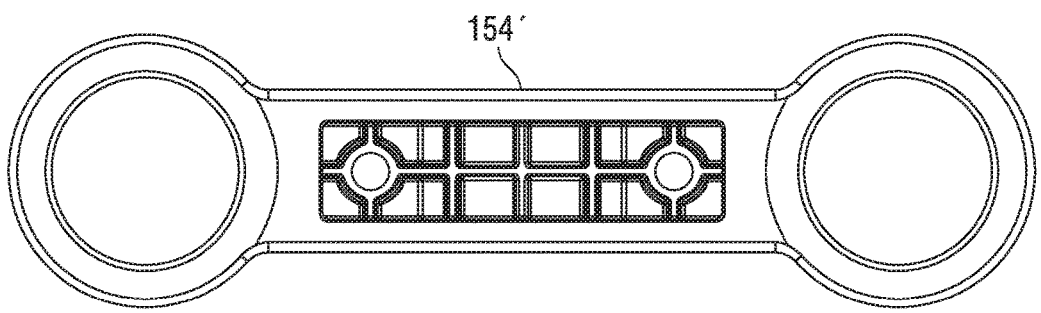
FIG. 38 is a top plan view of the top body half of the dual-rod holder of FIG. 31.

FIG. 30 illustrates another exemplary embodiment of a mobile fishing rod transportation and storage system 400. This system 400 is made from standard PVC piping.

At one side of the frame of any of the systems 100, 300, 400 described herein, a stub can be added that is shaped to fit within the orifice of a standard trailer hitch. In such a configuration, the system 300 to be mounted to the rear of a vehicle using an existing trailer hitch and a securing cross-pin, typically fixed therein with a cotter pin.

An alternative embodiment of the modular dual-rod holder 150 is shown, in an exemplary embodiment, in the dual-rod holder 150' of FIGS. 31 to 38. Instead of a center portion 152 and upper and lower connectors 154, 156, this dual-rod holder 150' has only two parts, a lower body half 152 and an upper body half 154. As above, two, three, or more dual-rod holders 150' can be fitted on each rod 124' of the rod-holder sub-assembly. Each of the parts for the dual-rod holder 150' is modular to reduce parts count and cost.

The upper and lower body halves 152', 154' form opposing clamp pieces to be secured around the rod 124'. The upper and lower body halves 152', 154' are secured to the rod 124' by a fastening mechanism shown, for example, in FIGS. 34 and 36. In this example, the fastening mechanism includes a U-bracket, a plate, and fasteners such as nuts.

The body halves 152', 154', when fastened together, have a center of gravity that is below the rod 124' to permit the dual-rod holder 150' to be in a self-righting state at all times, which keeps rod tips pointed upward and substantially safe from harm when a rod is placed within the rod tube(s). If desired, the bottom area of the lower body half 152' can be weighted to provide a further ability to self-right and/or, the bottoms of the rod tubes can be weighted, either integrally or separately, for example, by providing heavy outer rims at the rod tubes or the lower body half 152' itself can be weighted, integrally or separately, or made of a material that is heavier than the material of the upper body half 152'.

In a desirable exemplary embodiment, the body halves 152', 154' are made from injected-molded plastic Like parts and/or functions of the dual-rod holder 150' to the dual-rod holder 150 are not repeated here but are equally applicable to one another and vice versa. Where the dual-rod holder 150 is shown in any configuration here, the dual-rod holder 150 can be replaced by the dual-rod holder 150' or the dual-rod holder 150' can be added to use of the dual-rod holder 150. Accordingly, all of the possible configurations for the dual-rod holders 150, 150' are not repeated here or in the figures.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A mobile fishing rod transportation and storage system, comprising:
    at least two longitudinal rods;
    at least two horizontal rods;
    four corners connecting the at least two longitudinal rods to the at least two horizontal rods to form a frame, a first of the horizontal rods being horizontally and rotationally fixed to the at least two longitudinal rods, a second of the horizontal rods being horizontally fixed to the at least two longitudinal rods and being rotationally free with respect to the at least two longitudinal rods to permit rotation of the second horizontal rod;
    at least one rod holder rotationally connected with respect to one of the first and second horizontal rods between the at least two longitudinal rods to both:
        rotationally pivot along with the one horizontal rod when in a rod-holder locked state; and
        rotationally move independently of the one horizontal rod when in a rod-holder unlocked state; and
    a set of wheels connected to the frame to permit the frame to roll upon a surface of the environment.

2. The system according to claim 1, wherein:
    the first of the horizontal rods is horizontally and rotationally fixed to the at least two longitudinal rods adjacent a first pair of the four corners; and
    the second pair of the four corners comprising corner sub-assemblies rotationally freely connecting the second horizontal rod to the at least two longitudinal rods to permit rotation of the second horizontal rod.

3. The system according to claim 1, wherein the at least one rod holder comprises opposing clamp pieces movable with respect to one another between:
    a closed position comprising the rod-holder locked state in which the at least one rod holder is rotationally fixed to the one horizontal rod; and
    an open position comprising the rod-holder unlocked state in which the at least one rod holder is rotationally free to rotate about the one horizontal rod.

4. The system according to claim 3, wherein the at least one rod holder comprises a fastening mechanism that moves the clamp pieces between the closed position and the open position.

5. The system according to claim 4, wherein the fastening mechanism comprises a U-bracket, a plate, and nuts.

6. The system according to claim 1, wherein the at least two longitudinal rods and the at least two horizontal rods define a frame plane and the one horizontal rod has a rotation axis fixed within the frame plane.

7. The system according to claim 1, wherein:
    the at least two longitudinal rods and the at least two horizontal rods define a frame plane; and
    the one horizontal rod:
        has a rotation axis fixed within the frame plane; and
        rotationally moves about the rotation axis.

8. The system according to claim 1, wherein:
    the at least two longitudinal rods comprise a left longitudinal rod and a right longitudinal rod; and
    the at least two horizontal rods comprise:
        the first horizontal rod having:
            a first left end fixed to the left longitudinal rod; and
            a first right end fixed to the right longitudinal rod; and
        the second horizontal rod having:
            a second left end pivotally connected to the left longitudinal rod; and
            a second right end pivotally connected to the right longitudinal rod.

9. The system according to claim 1, wherein:
    the at least two longitudinal rods have an outer surface with a given shape;
    the at least two horizontal rods have an outer surface with the given shape; and
    at least two of the four corners are brackets comprising:
        a first recess having an interior shape corresponding to the given shape to longitudinally and rotationally fix one end of one longitudinal rod therein; and
        a second recess having a smooth interior longitudinally fixing and rotationally freely connecting one end of the one horizontal rod therein.

10. The system according to claim 9, wherein the given shape is a toothed spindle.

11. The system according to claim 1, wherein the at least one rod holder is at least one dual-rod holder on each of the at least two horizontal rods between the at least two longitudinal rods, the at least one dual-rod holder on the second horizontal rod rotationally pivoting with the second horizontal rod when in the rod-holder locked state and rotationally moving independently of the second horizontal rod when in the rod-holder unlocked state.

12. The system according to claim 1, wherein the at least two horizontal rods comprise two end horizontal rods and one central horizontal rod, the central horizontal rod having a given exterior shape, and which further comprises two central brackets each connected respectively to one of the at least two longitudinal rods at an intermediate position between the at least two horizontal rods and to one end of the central horizontal rod to longitudinally and rotationally fix the central horizontal rod to the respective one of the at least two longitudinal rods.

13. The system according to claim 1, wherein the at least two horizontal rods comprise two end horizontal rods and two central horizontal rods, the two central horizontal rods having a given exterior shape, and which further comprises:
    four T-brackets each connected respectively to:
        one of the at least two longitudinal rods at an intermediate position between the at least two horizontal rods; and
        one end of one of the central horizontal rods to longitudinally and rotationally fix a respective one of the central horizontal rods to the respective one of the at least two longitudinal rods, the two central horizontal rods and the at least two longitudinal rods defining therebetween a central opening; and
    a storage bin shaped to fit in the central opening and be carried by the frame.

14. The system according to claim 1, wherein at least one of the four corners is a handle sub-assembly comprising:
    a corner bracket connected to one of the at least two longitudinal rods and one of the at least two horizontal rods;
    a handle that is pivotally connected to the corner bracket to raise and lower the handle about a pivot axis with respect to the frame.

15. The system according to claim 14, wherein:
    the handle configured to telescope to elongate from a shortened state to a lengthened state; and
    the handle sub-assembly comprises:
        a handle rotation lock assembly having a lock that selectively locks and unlocks rotation of the handle about the pivot axis; and
        a rod-holder lock assembly having a lock that selectively locks and unlocks rotation of the second horizontal rod with respect to the corner bracket.

16. The system according to claim 1, wherein the at least two longitudinal rods and the at least two horizontal rods have a cross-section with a given outer shape selected from one of a circle, a gear, an oval, an ellipse, a stadium, a quatrefoil, a trefoil, a cinquefoil, a nephroid, a kidney, an egg, a polygon, a triangle, a square, a pentagon, a hexagon, a heptagon, an octagon, a nonagon, and a decagon.

17. The system according to claim 1, wherein:
    the at least two longitudinal rods are two longitudinal rods; and
    the set of wheels is a set of four casters, two of the casters being connected to a first of the two longitudinal rods, and two of the casters being connected to a second of the two longitudinal rods.

18. The system according to claim 1, wherein the set of wheels is connected only to the at least two longitudinal rods.

19. A mobile fishing rod transportation and storage system, comprising:
    at least two longitudinal rods;
    at least two horizontal rods;
    a central horizontal rod;
    four corners connecting the at least two longitudinal rods to the at least two horizontal rods to form a frame, a first of the horizontal rods being horizontally and rotationally fixed to the at least two longitudinal rods, a second of the horizontal rods being horizontally fixed to the at least two longitudinal rods and being rotationally free with respect to the at least two longitudinal rods to permit rotation of the second horizontal rod;
    at least one rod holder rotationally connected with respect to one of the first and second horizontal rods between the at least two longitudinal rods to both:
        rotationally pivot along with the one horizontal rod when in a rod-holder locked state; and
        rotationally move independently of the one horizontal rod when in a rod-holder unlocked state;
    a set of wheels connected to the frame to permit the frame to roll upon a surface of the environment; and
    two central brackets each connected respectively to:
        one of the at least two longitudinal rods at an intermediate position between the at least two horizontal rods; and
        one end of the central horizontal rod to longitudinally and rotationally fix the central horizontal rod to the respective one of the at least two longitudinal rods.

20. A mobile fishing rod transportation and storage system, comprising:
    at least two longitudinal rods;
    at least two horizontal rods;
    four corners connecting the at least two longitudinal rods to the at least two horizontal rods to form a fixed frame with the at least two horizontal rods being horizontally and rotationally fixed to the at least two longitudinal rods in a frame plane;
    at least one rod holder rotationally connected with respect to one of the first and second horizontal rods between the at least two longitudinal rods to both:
        rotationally pivot along with the one horizontal rod when in a rod-holder locked state; and
        rotationally move independently of the one horizontal rod when in a rod-holder unlocked state; and
    a set of wheels connected to the frame to permit the frame to roll upon a surface of the environment.

* * * * *